358-84 SR
8/12/86 OR 4,605,958

United States Patent [19]
Machnik et al.

[11] Patent Number: 4,605,958
[45] Date of Patent: Aug. 12, 1986

[54] METHOD AND APPARATUS FOR DETECTING THE CHANNEL TO WHICH AN ELECTRONIC RECEIVER SYSTEM IS TUNED

[75] Inventors: Patrick R. Machnik, Roseville; Bruce L. Petersen, Mounds View; Robert G. Schultz, New Brighton; Jerry T. Thatcher, Shoreview, all of Minn.; Roscella A. Whiting, Lanham, Md.

[73] Assignee: Control Data Corporation, Minneapolis, Minn.

[21] Appl. No.: 486,003

[22] Filed: Apr. 14, 1983

[51] Int. Cl.[4] .......................... H04N 17/04; H04H 9/00
[52] U.S. Cl. .......................................... 358/84; 455/2
[58] Field of Search ................ 179/2 AS; 358/84, 86, 358/191.1, 192.1, 193.1; 455/2, 4, 5, 165, 166

[56] References Cited

U.S. PATENT DOCUMENTS 2,630,367 3/1953 Rahmel .
3,230,302 1/1966 Bruck et al. .......................... 358/84
3,769,579 10/1973 Harney .
3,947,624 3/1976 Miyake ................................ 358/84
3,987,397 10/1976 Belcher et al. .......................... 455/2
4,044,376 8/1977 Porter .................................. 358/84
4,048,562 9/1977 Haselwood et al. .................... 455/2
4,058,829 11/1977 Thompson ........................... 358/84
4,216,497 8/1980 Ishman et al. ........................ 358/84
4,385,315 5/1983 George et al. ................... 358/191.1
4,388,644 6/1983 Ishman et al. ........................ 358/84
4,425,578 1/1984 Haselwood et al. .................. 358/84
4,425,579 1/1984 Merrell ....................... 358/191.1 X

*Primary Examiner*—Keith E. George
*Attorney, Agent, or Firm*—Cushman, Darby & Cushman

[57] ABSTRACT

A cable meter for monitoring the channel selected by a converter of a television system which receives signals by means of cable. The cable is connected to the cable meter and the output of the cable meter is applied to the converter. The output of the converter is connected back to the cable meter which, in turn, provides an output to the television. During normal operation, signals received by the cable meter from the cable pass directly to the converter, and a selected channel from the converter passes through the cable meter to the television. To monitor the channel selected, an oscillator generates a substitution signal which is substituted for the television signal applied to the converter. The cable meter then monitors whether the substitution signal passes through the converter, during which period, the cable meter prohibits this substitution signal from reaching the television. By varying the frequency of the substitution signal, a search is performed for the selected channel. Techniques are employed to enhance the accuracy of the monitoring. The present invention has applicability to any communications system in which radio frequency signals are transmitted over any medium, such as televisions with internal tuners which may not even be adapted to receive cable signals or radio receivers.

56 Claims, 16 Drawing Figures

METHOD AND APPARATUS FOR DETECTING THE CHANNEL TO WHICH AN ELECTRONIC RECEIVER SYSTEM IS TUNED

BACKGROUND OF THE INVENTION

1. Field of the Invention

The present invention relates to the monitoring of communications receivers, and more particularly, to the monitoring of the channel to which a receiver is tuned.

2. Description of the Prior Art

In the entertainment field, the size of an audience enjoying an event or program is often monitored as an important indicator of popularity or success. This is particularly true with entertainment provided over electronic communications systems such as television and radio. The audience size is employed not only to determine the popularity of a particular program or show, but also to assist in making programming decisions. Furthermore, advertising rates are based upon audience size.

Determining the size of an electronic communications system audience is particularly difficult due to the dispersed nature of the audience. Heretofore, telephonic surveys have been conducted to determine the number of individuals watching particular radio or television programs. However, such surveys are highly labor intensive. Furthermore, the necessity of calling thousands of households makes such surveys time consuming.

To overcome problems associated with telephonic surveys, electronic monitoring techniques have been developed. Thus, U.S. Pat. Nos. 4,058,829 to Thompson and 4,044,376 to Porter teach television monitoring devices. According to these patents, a signal is injected into the radio frequency input of the television at a frequency corresponding to the carrier frequency of a particular channel. A probe attached to some point within the video circuits of the television determines whether the injected signal has passed through the tuner. If the injected signal has not passed through the tuner, then the frequency of the injected signal is changed to the carrier frequency of another channel and the determination is repeated. This process continues until a frequency is selected which enables the injected signal to pass through the tuner. The channel to which the television is tuned is then known.

See also U.S. Pat. Nos. 4,216,497 to Ishman et al and 2,630,367 to Rahmel which teach television monitoring systems.

Cable television systems are becoming more popular, and therefore more significant with respect to audience monitoring. FIG. 1 illustrates the typical arrangement of a cable television system. In FIG. 1, cables 100 and 102 are applied to cable converter 104. Each of cables 100 and 102 carries 65 channels in the present embodiment. The output of cable converter 104 is applied to television 106. Cable converter 104 may be in a separate housing which sits atop television 106. Cable converter 104 selects one of the 124 channels carried over cables 100 and 102 and adjusts the carrier frequency of the selected channel to a predetermined frequency, typically corresponding to the carrier frequency of channel 2, 3 or 4 on television. Cable converter 104 is, therefore, said to have a fixed, or single channel output. Thus, television 106 remains set on channel 2, 3 or 4, as specified by the cable TV company, and channel selection is done at cable converter 104 by tuning to a particular carrier frequency on one of cables 100 and 102.

Electronic channel detectors have also been developed which are particularly suited for cable television systems. Examples of such detectors are disclosed in U.S. Pat. Nos. 4,048,562 to Haselwood et al, 3,769,579 to Harney, 3,230,302 to Bruck et al and 3,987,397 to Belcher et al.

SUMMARY OF THE INVENTION

The present invention accurately detects the channel of a communications system medium which has been selected by a receiver.

The preferred embodiment of the present invention (hereinafter referred to as a "cable meter") is employed in a cable television system. In such a system, a cable carrying the television signals is connected directly to a multifrequency input of the cable meter. A multifrequency output of the cable meter is connected to a conventional cable converter. The output of the converter is connected to a single frequency input of the cable meter. A signal is provided from a single frequency output of the cable meter to a television. Thus, when used in a communication systems having a separate channel selector, the present invention may be connected to the system in a noninvasive manner.

During normal operation, cable signals pass through the multifrequency terminals of the cable meter to the converter which selects the desired channel. The signals from the selected channel pass back through the cable meter and are applied to the television. To determine the channel selected, the cable meter generates a signal at a frequency related to the carrier frequency of one of the channels on the cable. This signal is substituted at the converter input for the signals on the cable and the output of the converter is monitored by a single channel receiver to determine whether the substitution signal passes through the converter. If the substitution signal does not pass through the converter, then the cable meter substitutes another signal related to the carrier frequency of a different channel, and the output of the converter is monitored. In the preferred embodiment, the frequency range over which searching occurs can be adjusted, so as to avoid searching unnecessary channels. Also in the preferred embodiment, searching begins with the highest frequency and progresses to successively decreasing frequencies.

The search procedure continues until a substitution signal passes through the converter, indicating that the converter is set to select the channel having a carrier frequency related to the frequency of the substitution signal. In this manner, the cable meter uses a signal substitution/response measurement technique in some ways analogous to that employed by the Porter and Thompson patents, supra. However, since the output of the converter is applied to the cable meter, instead of being connected directly to the television, the cable meter is able to block the substitution signals from being applied to the television.

The power cord of the television may be plugged into the cable meter, so that the cable meter can monitor when the television is on. Data collected by the cable meter may then be sent to a household collector which receives data from other cable meters as well.

In the preferred embodiment of the present invention, the identification of a selected channel during a first searching operation causes only a preliminary indication of the selected channel to be generated. The searching operation is performed again, and after two searching operations produce the same results, the indication of the selected channel is verified. To reduce the possibility of errors induced by the generation of sub-multiple frequency components with the substitution signals, the strength of the substitution signals applied to the converter may be reduced during the second search operation.

In fact, if the second search at the reduced level either fails to identify a selected channel or identifies a channel different from the channel identified during the first search, the searching operation is repeated for a third time. In the former situation, the third search is conducted at a high level and if the same channel as in the first search is identified, the indication of the selected channel is verified. In the latter situation, the third search is conducted at a low level and if the same channel is identified in the second and third searches, the indication as to the channel identified during the second and third searches is verified. Once a channel indication has been verified, the program shifts into a shorter, more circumscribed, operating sequence to monitor the verified channel, until the channel is changed. When the channel selected by the converter is changed, an indication of the change is generated only after the cable meter fails to confirm that the selected channel remains the same in a predetermined plurality of consecutive attempts.

The intervals between transmissions to the household collector, in the preferred embodiment of the present invention, may be varied. In this manner, the probability of simultaneous transmissions from different monitors to the same household collector is reduced. Also, the timing of the substitution signal with respect to the television signals on the selected channel is controlled so that the substitution signals are applied to the converter either during the blanking portion of the television signal or during the top few lines of the video portion of the signal. In this manner, interruption of the television picture is minimized. In fact, the preferred embodiment enables the timing to be varied so as to avoid substitution during portions of the television signal which might be used locally for other purposes.

In addition to receiving signals from cables, the present invention also includes auxiliary inputs which may be selected by means of a switch. Such inputs would be for video games, computers, video recorders or the like. When one of the auxiliary inputs has been selected, the signal from the auxiliary source passes through the present invention and is applied to the television. During this period, the present invention generates a signal to the household collector indicating that an auxiliary input has been selected.

To maximize the efficiency of the present invention, the system must be tuned as well as possible to the selected channel. In the preferred embodiment, if the television signal is not being adequately received, the signal is attenuated to degrade the picture quality and force the viewer to attempt to better tune in the channel.

As a result of the present invention as described above, all connections to a receiver system employing the present invention may be made directly to the present invention. In receiver systems employing a separate channel selector, the present invention may be added with no connections internal to any of the components. The inclusion of a single channel receiver within the meter avoids the necessity of making connections internal to cable converter 104 and television 106.

The present invention ensures accurate monitoring as a result of a number of features. The repetition of the search operation reduces the possibility of erroneously identifying a non-selected channel. Starting each search at a high substitution signal frequency reduces the possibility of error caused by substitution signal harmonics and repeating the search at a reduced substitution signal level reduces the possibility of error caused by sub-multiple components of the substitution signals. In fact, the particular pattern of high and low level substitution signals during consecutive searches is intended to maximize the probability of correctly identifying a selected channel. The possibility of erroneously reporting a change in channel selection is reduced in the present invention in that an indication that the selected channel has been changed is not generated until the present invention unsuccessfully monitors for the selected channel over a plurality of consecutive attempts.

The cable meter of the present invention is microprocessor based and employs a frequency synthesized oscillator which is under microprocessor control. As a result, whereas in the past a separate oscillator and discrete components were required for each channel to be searched, in the present invention the desired substitution frequencies are generated by the frequency synthesized oscillator in response to control signals supplied by the microprocessor. This feature greatly simplifies design and expense in construction as well as substantially expanding the capabilities of the meter.

The present invention has application beyond cable television systems with detached cable converters. In fact, certain aspects of the present invention can be employed with any radio frequency communications receiver system which employs a channel selector, such as radio and television (including television with an internal tuner). Throughout this application, including the claims, the term "channel" will mean a signal carrying data, differentiable in some manner from other signals carrying data.

BRIEF DESCRIPTION OF THE DRAWINGS

These and other objects and advantages of the present invention will become more apparent and more readily appreciated from the following detailed description of the presently preferred exemplary embodiment of the present invention, taken in conjunction with the accompanying drawings, of which.

DETAILED DESCRIPTION OF PRESENTLY PREFERRED EMBODIMENT

The presently preferred embodiment of the invention is described hereinafter for use with a cable television receiver employing a typical, separate cable converter. However, certain aspects of the present invention have applicability to any radio frequency communication system employing a channel selector, whether the communication system be television, radio or the like.

Figure 1:
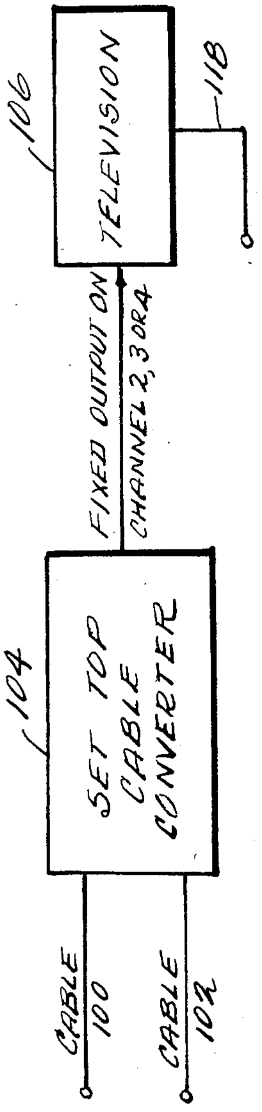
FIG. 1 (PRIOR ART)
FIG. 1 is a schematic drawing of a conventional cable television system.
Figure 2:
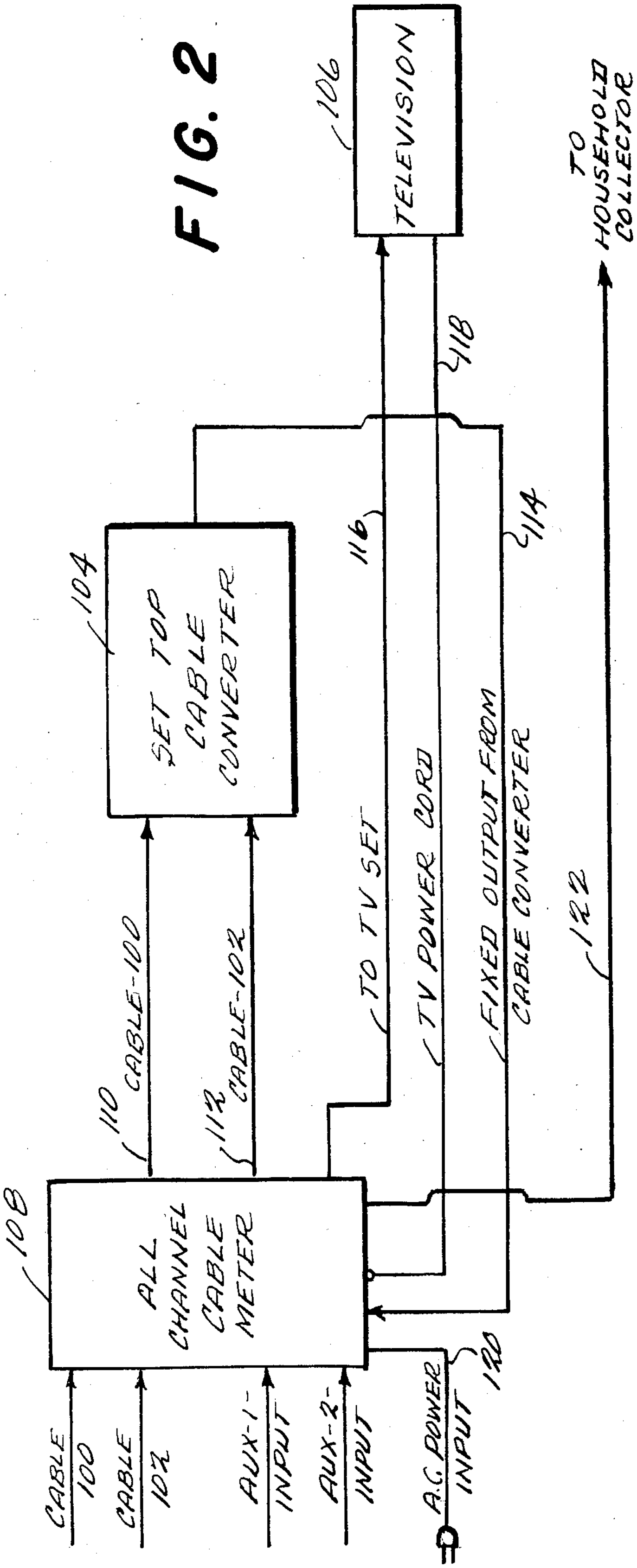
FIG. 2 is a schematic diagram of the connection of the cable meter of the presently preferred embodiment of the present invention to a television and cable converter.

In FIG. 2, the preferred embodiment of the present invention, referred to herein as "cable meter" 108 is connected to a medium such as cables 100 and 102 through multifrequency or multichannel inputs. Multifrequency, multichannel outputs of cable meter 108 are connected to a channel selector such as cable converter 104 via lines 110 and 112, respectively. The output of converter 104 is applied to a single frequency or channel input of cable meter 108 via line 114. A single frequency or channel output of cable meter 108 is connected to a radio frequency (r.f.) communications system receiver such as television 106 via line 116.

Power cord 118 of television 106 is connected to cable meter 108 so that cable meter 108 can monitor when television 106 is energized. Power is applied to cable meter 108 by means of power cord 120.

Data collected by cable meter 108 is outputted to a household collector over line 122.

Cable meter 108 also provides for the input of auxiliary video signals through its auxiliary 1 and auxiliary 2 inputs. These inputs enable the television receiver system to be utilized with a video cassette recorder, video disc, personal computer, video games, etc. Signals applied to auxiliary inputs 1 and 2, when selected by cable meter 108, pass directly to television 106 over line 116.

Figure 3:
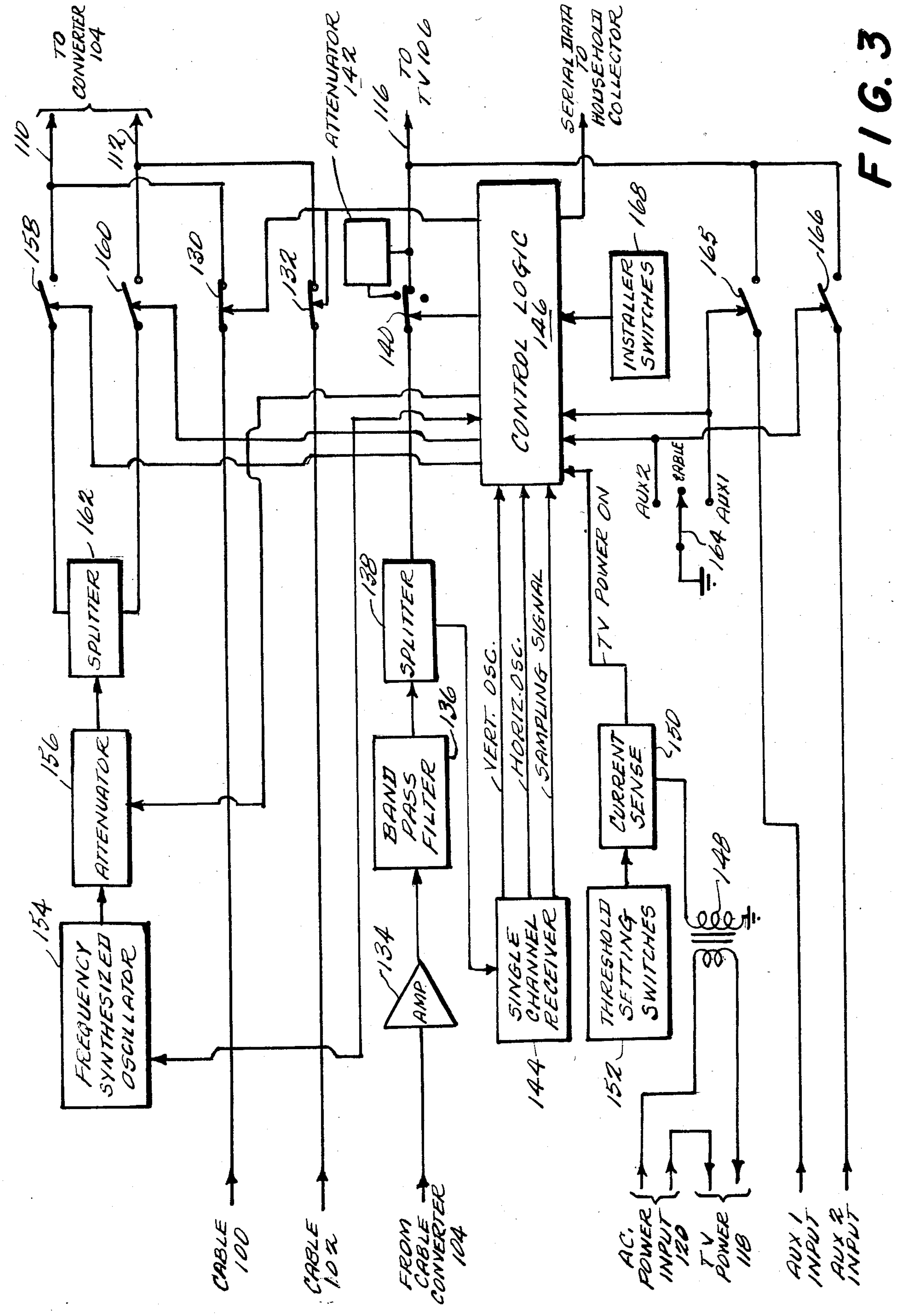
FIG. 3 is a block diagram of the cable meter.

FIG. 3 provides additional details concerning the components of cable meter 108. Signals on cables 100 and 102 are applied to switches 130 and 132. In the preferred embodiment, these switches are electronic and are actuated by control signals. As illustrated in FIG. 3, switches 130 and 132 are normally closed so that signals on cables 100 and 102 pass over lines 110 and 112 to cable converter 104.

The signal from converter 104 at the fixed carrier frequency is applied to cable meter 108 where it passes through amplifier 134, bandpass filter 136 and splitter 138. Bandpass filter 136 narrows the frequency range of the output signal from cable converter 104 to prevent channel misidentification. A portion of the signal from splitter 138 passes through normally closed switch 140 and is applied to television 106. Switch 140 is, in the preferred embodiment, an electronic switch which responds to a control signal. Switch 140 is different from switches 130 and 132 in that it has three positions. Switch 140 can either be open, be closed, or cause signals to be attenuated (i.e., reduced in strength) such as, for example, by passing them through attenuator 142 before applying them to television 106.

The other portion of the signal from splitter 138 is applied to single channel receiver 144 which generates a vertical oscillator signal, a horizontal oscillator signal and a sampling signal. These signals are applied to control logic 146 as illustrated. The vertical oscillator signal is generated from a local oscillator within single channel receiver 144 and is characterized by pulses synchronized with the vertical sync pulses in the video signal. The horizontal oscillator signal is also generated from the local oscillator within receiver 144 and is synchronized with the horizontal sync pulses in the video data. The sampling signal is digital, having either a high "positive" value or a low "negative" value as will be described later.

The power being drawn by television 106 is monitored through transformer 148 and current sensing circuitry 150. The threshold at which a TV power on signal is sent to control logic 146 is determined by threshold setting switches 152. The threshold switches are necessary to prevent a false indication of "power on" from so-called "instant on" televisions which always draw some current whenever they are plugged in.

Figure 4:
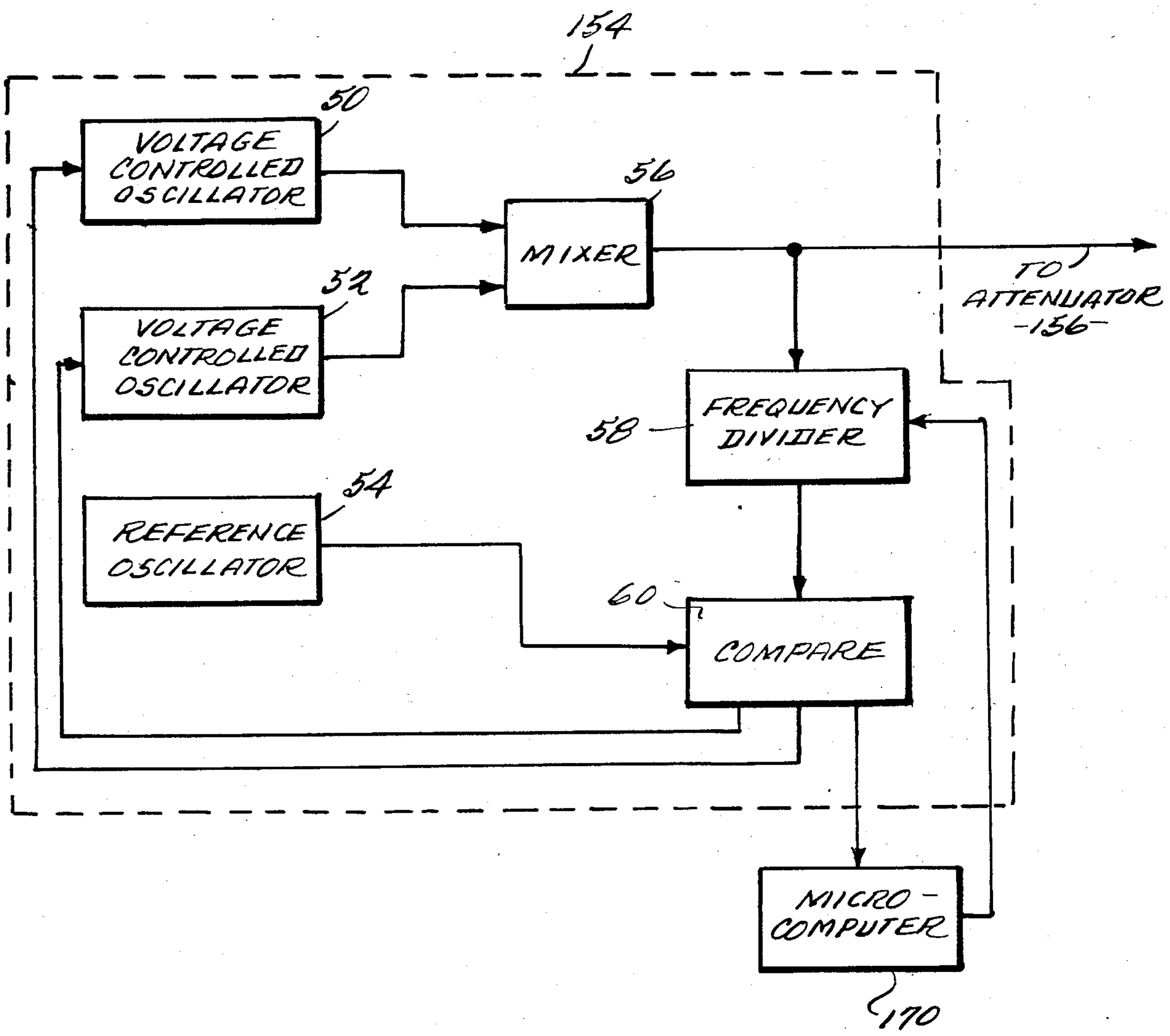
FIG. 4 is a block diagram of the frequency synthesized oscillator 154 of FIG. 3A.

Frequency synthesized oscillator 154 generates a frequency substitution signal related to a control signal provided by control logic 146. As shown in FIG. 4, frequency synthesized oscillator 154 includes two voltage controlled oscillators 50 and 52, and a reference oscillator 54. The oscillators 50 and 52 are adjusted by control signals from compare circuitry 60 (later described) in opposite directions and their respective outputs are input to mixer 56 which generates a difference frequency. A difference frequency input is provided to frequency divider circuitry 58. Microprocessor 170 (later described in more detail) loads a divisor into frequency divider 58 which is representative of the frequency next to be substituted into cable converter 104. The difference frequency is divided down in frequency divider circuit 58 according to the divisor supplied by microprocessor 170, and then compared at compare circuit 60 with the reference oscillator frequency. The compare circuit 60 provides outputs to oscillators 50, 52 to continually adjust the oscillators 50, 52 until the divided down difference frequency is equal to the reference frequency. Once the compare circuit 60 inputs are equal, compare circuit 60 indicates a "lock" condition to microprocessor 170 and microprocessor 170 will then substitute the difference frequency from mixer 56 into cable converter 104 at the appropriate time according to the microprocessor program sequence later described.

The output of oscillator 154 is applied to attenuator 156 as shown in FIG. 3. Control logic 146 has an input to attenuator 156 to control whether or not the signal generated by oscillator 154 is attenuated.

The frequency substitution signal generated by oscillator 154 passes through attenuator 156 and splitter 162 to switches 158 and 160. These switches are similar to switches 130 and 132, and are controlled by control logic 146. During normal operation, switches 158 and 160 are opened. However, during a channel detecting operation, switches 158 and 160 are closed, while switches 130, 132 and 140 are opened. As a result, the frequency substitution signal from oscillator 154 is applied to converter 104 over lines 110 and 112.

Switch 164 causes control logic 146 to select signals from cables 100 and 102, the auxiliary 1 input or the auxiliary 2 input. If the auxiliary 1 input is selected, control logic 146 closes switch 165 so that signals from the auxiliary 1 input terminal pass to television 106. At the same time, a signal is provided by control logic 146 which causes switch 140 to open. Similarly, if the auxiliary 2 input is selected, control logic 146 closes switch 166 so that signals at the auxiliary 2 input pass to television 106. Installer switches 168 may be employed to set a number of parameters of cable meter 108.

Figure 5:
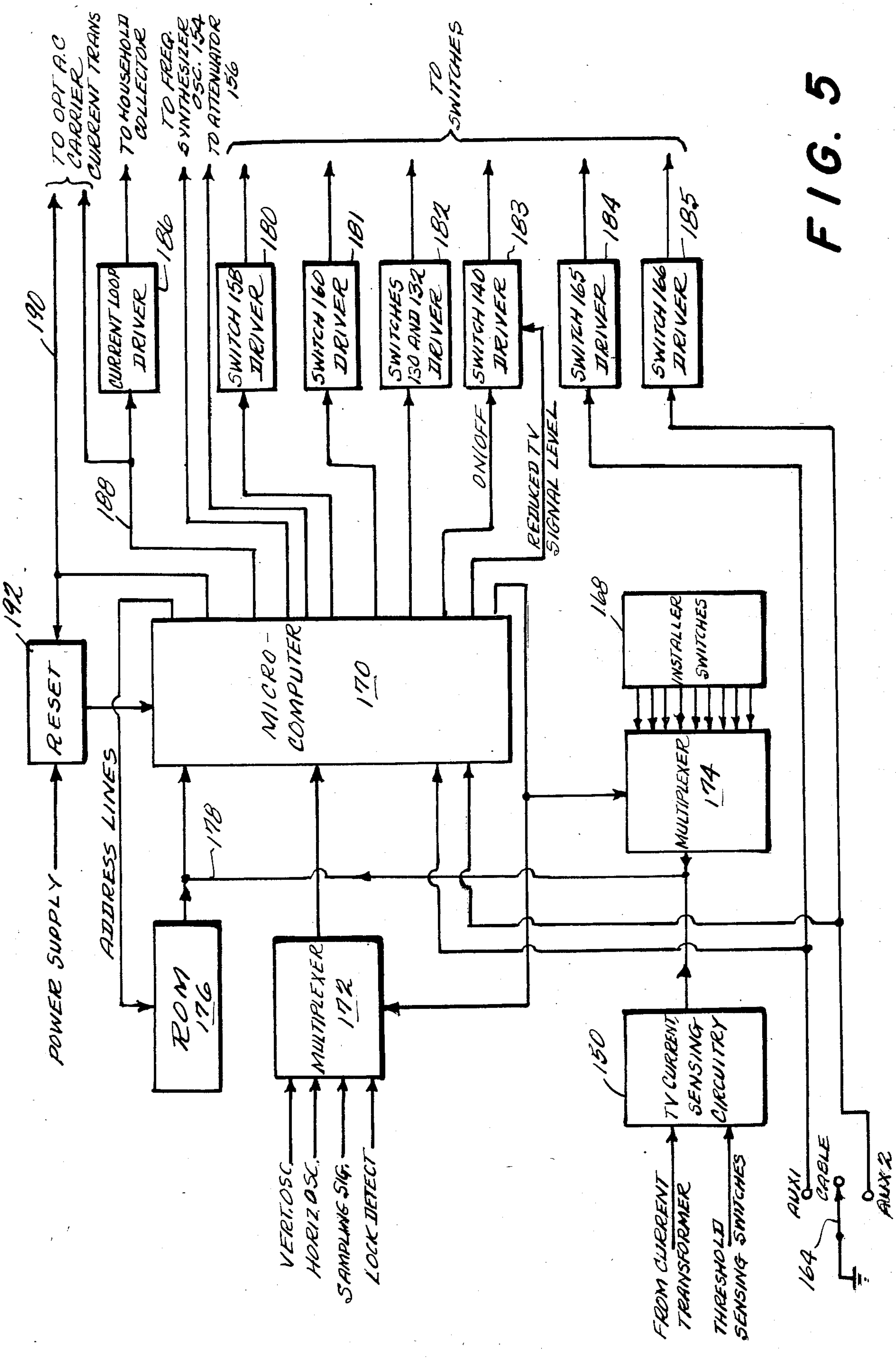
FIG. 5 is a block diagram of the control logic of the cable meter.

Control logic 146, together with associated components, is illustrated in FIG. 5. The heart of control logic 146 is microcomputer 170, which, in the preferred embodiment, is a model 8049H microcomputer manufactured by Intel Corporation. Microcomputer 170 receives inputs from a number of sources. Thus, multiplexer 172 receives the vertical oscillator and horizontal oscillator signals and the sampling signal from single channel receiver 144, and a frequency lock signal from frequency synthesized oscillator 154. Multiplexer 172 applies these signals to microcomputer 170.

Multiplexer 174 receives signals from installer switches 168. Installer switches 168 are used for several important purposes. They are used to determine the code by which each particular cable meter 108 identifies itself to a household collector. Also, installer switches 168 set the interval between data transmissions from cable meter 108 to the household collector. The transmission intervals are set to vary about a 2 second transmission interval. Each cable meter 108 connected to a common household collector has a transmission interval of slightly different length to minimize the number of times that data from different meters simultaneously arrives at the household collector. The simultaneous arrival of data from different meters would result in data destruction. Also, installer switches 168 determine the portion of the vertical blanking interval in a television signal where the frequency substitution signal from frequency synthesized oscillator 154 is substituted. Depending on the locality, certain portions of the blanking interval may be unavailable because they are reserved for television test signals, closed caption or teletext, for example. Consequently, the installer switches can be set to progressively move the position at which the frequency substitution signal is substituted within the vertical blanking interval or the top few lines of the television picture. Other installer switches 168 are used to limit the frequency range of the search to be made for a selected channel where certain cable channels are not to be logged. Installer switches 168 also determine the highest cable channel frequency at which channel searching begins. In the preferred embodiment, channels may be searched starting at 300 MHz, or starting at 450 MHz. Incidentally, threshold setting switches 152 in FIG. 3 are also set by the installer.

The output of multiplexer 174, TV current sensing circuitry 150 and ROM 176 are all applied to data bus 178 which is input to microcomputer 170. ROM 176 is addressed by a signal from microcomputer 170 and is customized for a particular locality to allow for special adjustments to frequency selection and frequency decrementation of oscillator 154.

Microcomputer 170 also receives signals from switch 164 to indicate whether signals have been selected to be received from cables 100 and 102, auxiliary 1 input or auxiliary 2 input. The signals from switch 164 also control switch drivers 184 and 185 which operate switches 165 and 166.

Finally, microcomputer 170 receives a reset signal from reset circuit 192. When power to cable meter 108 is being received, cable meter 108 periodically produces transmissions to a household data collector. Reset circuit 192 monitors the transmission of data to the household collector (by monitoring transmit enable line 190). If transmissions should stop, microcomputer 170 has become hung up in a loop of its program. If a transmission does not occur within a predetermined period of time, reset circuit 192 causes microcomputer 170 to be reset.

Microcomputer 170 controls a number of elements of cable meter 108. Thus, microcomputer 170 sends a signal to frequency synthesizer oscillator 154 to select the frequency generated by oscillator 154 and a signal to attenuator 156 to control whether a full strength or reduced strength signal will be substituted. Also, microcomputer 170 controls switch drivers 180 through 183 which control switch 158, switch 160, switches 130 and 132, and switch 140, respectively. Note that switches 130 and 132 are always in the same state, and thus can be controlled by the same signal. As indicated above, switch 140 is a three position switch. Therefore, two separate signals must be applied to driver 183. One signal may be considered an on/off signal and the other signal may be considered a reduced level signal. The reduced level signal causes the signal to be attenuated such as by connecting switch 140 to the attenuator 142 shown in FIG. 3.

In addition to controlling multiplexers 172 and 174, microcomputer 170 also generates signals which are applied through current loop driver 186 to a household collector. Instead of providing a wire between each cable meter 108 in a household and a common household collector, it is possible to employ the AC power lines to transmit data signals between each cable meter 108 and a common household collector. Accordingly, microcomputer 170 generates data for the household collector on line 188 and a transmit enable signal on line 190 which may be applied to an optional AC carrier current transmitter which transmits the data on the AC power lines.

The channel monitoring operation of cable meter 108 as illustrated in FIGS. 3–5 will now be described with respect to the simplified flow chart of the operation of microcomputer 170 in FIG. 6. The channel monitoring program of microcomputer 170 begins when power is applied to microcomputer 170 or when microcomputer 170 is reset at step 194. The program then performs a number of initializations at step 196. Director 198 is the top of the main loop of the program, as will become apparent from the following discussion.

At step 200, microcomputer 170 performs various status testing steps to be certain that the hardware is performing properly. If any problems are detected, the transmission status is set to an appropriate code to identify the problem and a corresponding status is sent to the household collector. The program then returns to director 198. At step 201 the program goes through a procedure to ensure that the TV signal is being adequately received. If it is not, the program returns to director 198.

Assuming that the TV signal is being received adequately, the program moves to step 202 where the value of a variable stored in a register called "hit value" is considered. An explanation of this variable will be provided hereinafter. Since "hit value" has been reset to zero at initialization step 196, the program passes to step 204 which causes a pointer to indicate an address at the start of a table. The table contains indications related to the particular frequencies of the substitution signals and, therefore, of the carriers of the channels to be monitored by cable meter 108. At step 206, microcomputer 170 causes an indication of the frequency of the next substitution signal to be generated by oscillator 154 to be retrieved from the table. At step 208, it is determined whether the table has been completely scanned.

During the first pass through the program, the pointer will not be at the end of the table so that the program passes to step 210. Up until step 208, assuming that switch 164 in FIG. 3 is set to cable, signals from cables 101 and 102 have been passing through closed switches 130 and 132 to converter 104. The signal from converter 104 has been passing through amplifier 134, filter 136, splitter 138 and switch 140 to television 106. At step 210 of the program a number of changes are made with respect to the switches. Switches 130, 132 and 140 are momentarily opened and switches 158 and 160 are momentarily closed. This causes the frequency substitution signal generated by oscillator 154 under the control of microcomputer 170 to be applied to converter 104. The signal from converter 104 is monitored by receiver 144, and if converter 104 has been set to the channel having a carrier frequency very nearly the same as the frequency of the signal generated by oscillator 154, receiver 144 generates a sampling signal by which microcomputer 170 determines that the channel selected by converter 104 has been determined, or, in other words, a "hit" has been made. If microcomputer 170 does not receive a sampling signal, microcomputer 170 continues the search.

The table of frequencies in microcomputer 170 is organized so that indications of the highest frequencies occur at the beginning of the table and sequentially decrease through the table. If oscillator 154 first generates a substitution signal having a frequency corresponding to the highest carrier frequency channel, any second harmonic component (twice the fundamental frequency) generated with the substitution signal will not cause channel misidentification. For example, if oscillator 154 is generating a substitution frequency of 108 MHz and a 216 MHz second harmonic component, and if cable converter 104 is set at 216 MHz, a positive sampling signal may be generated, indicating incorrectly that the channel selected by converter 104 is 108 MHz. To avoid this problem, searching is begun at the highest frequency and progressively stepped downwardly channel by channel. Since the 216 MHz substitution signal will be generated before the 108 MHz substitution signal, no misidentification can occur.

Microcomputer 170 uses the vertical oscillator and horizontal oscillator signals to determine the precise portion of the television signal for which the frequency substitution signal is to be substituted, i.e., the precise moment with respect to the television signal at which switches 158 and 160 are to be closed and switches 130, 132 and 140 are to be opened.

Assuming that a hit is not made at the first frequency, the program returns to step 206 to get the next frequency indication from the frequency table in microcomputer 170. This searching process continues until a hit is made. If the program goes through the entire frequency table without making a hit, step 208 will cause the program to progress to step 212 where the transmission status will be set to an appropriate code indicating that no channel has been identified and the program returns to director 198.

If a hit is detected at step 210, the next task is to determine whether the selected channel is on cable 100 or 102. Once this is resolved at step 214, the transmission status is updated at step 215 to preliminarily indicate that the channel to which the converter is tuned has been identified. At step 216 microcomputer 170 checks whether the latest hit is the second consecutive hit at the same frequency. To reduce the possibility of erroneous reporting, cable meter 108 must again determine that converter 104 is set to the same channel in order to verify that the channel has been found. If the latest hit in step 216 is only the first hit, the program returns to director 198.

If the latest hit was, in fact, the second consecutive hit at the same frequency, the hit value is set to four at step 218. The program then returns to director 198.

After the second consecutive hit, the next pass through the main loop of the program will reach step 202. Since the hit value is not equal to zero, the program executes step 220 at which the hit value is decremented to three. At step 222, a substitution signal having a frequency the same as the frequency of the substitution signal which caused the last hit is substituted for the television signal received from cable 100 or 102. Step 222 determines whether converter 104 remains set to select the same channel. Thus, in response to the substitution signal, microcomputer 170 determines whether single channel receiver 144 generates a sampling signal. If microcomputer 170 does receive a sampling signal, the channel preliminarily identified is verified at step 223 and now the computer will move through a shortened program loop as will be explained later on. The hit value is reset to four at step 224, and the program then returns to director 198.

The program continues to cycle through the shortened loop including steps 200, 201, 202, 220, 222, 223, 224 and 198 as long as converter 104 continues to select the same channel as was identified during the last search. Eventually, a different channel will be selected so that a sampling signal is not generated in response to the frequency substitution signal transmitted to converter 104 in step 222. As a result, the program progresses to step 226 at which it is determined whether the hit value is zero. If the hit value is not zero, the program returns to director 198. Since step 220 decrements the hit value by one with each pass, the program will cycle four times through steps 222 and 226 as long as a sampling signal is not generated. After the fourth pass in which no sampling signal is generated, it is determined in step 226 that the hit value is zero. This causes microcomputer 170 to execute step 212 where the transmission status will be changed to indicate that the channel has been lost. The program then returns to director 198, and steps 204–216 perform another searching operation.

The requirement of four passes before the status is changed reduces the generation of erroneous data. The frequency substitution signal may occasionally be lost between cable meter 108 and converter 104. Before cable meter 108 does anything to change its status in response to such a loss, the frequency substitution signal must not be recovered on four consecutive attempts. It has been determined that if a sampling signal is not generated on any of four consecutive attempts, then it is assumed that the channel selected by cable converter 104 has been changed by the viewer.

Figure 6:
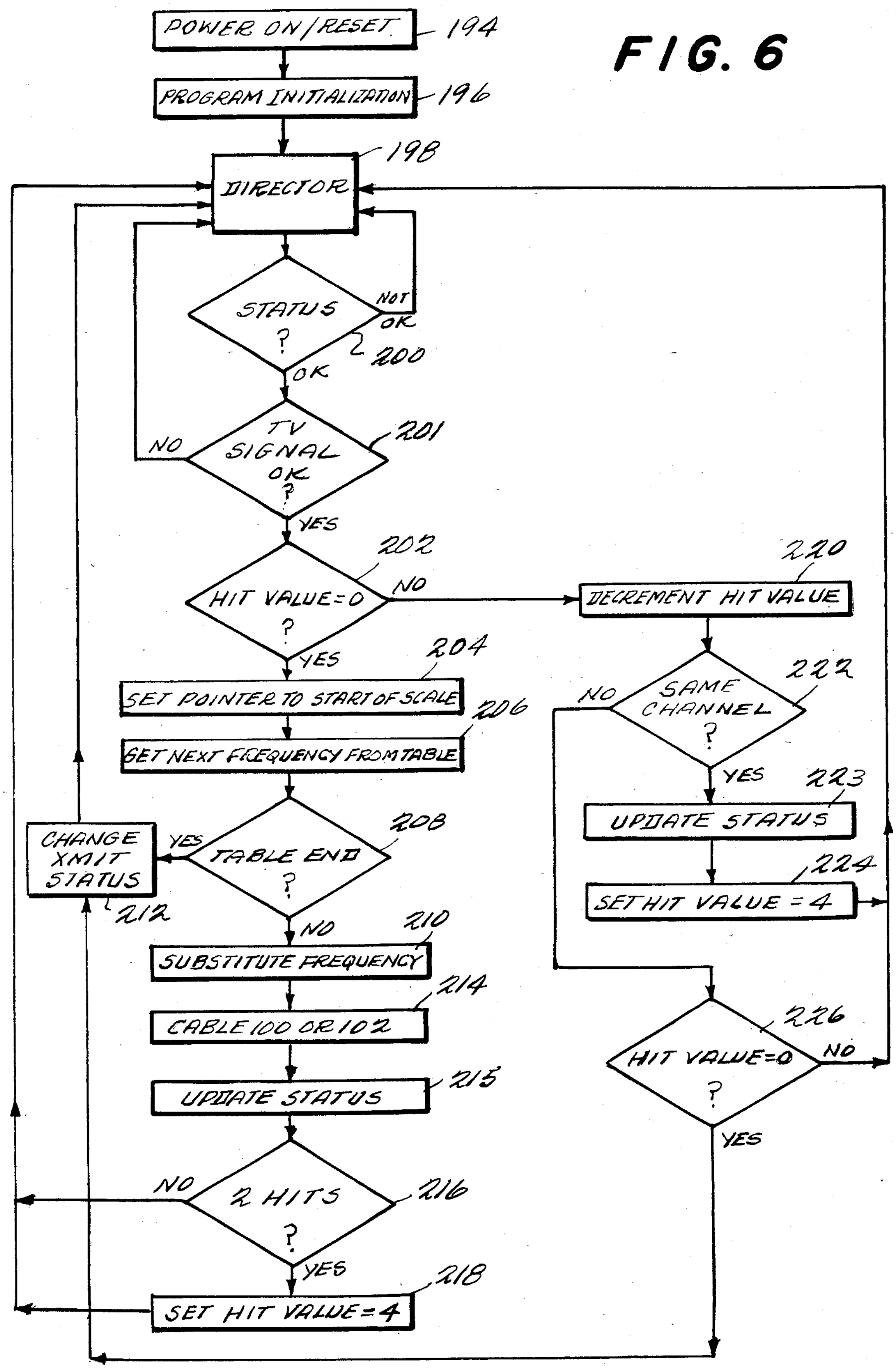
FIG. 6 is a general flow chart of the channel detecting program, of the present invention.

FIGS. 7 through 13 illustrate in more detail the channel detecting program executed by microcomputer 170, including important features of the present invention which are not included in the simplified flow chart illustrated in FIG. 6.

Figure 7:
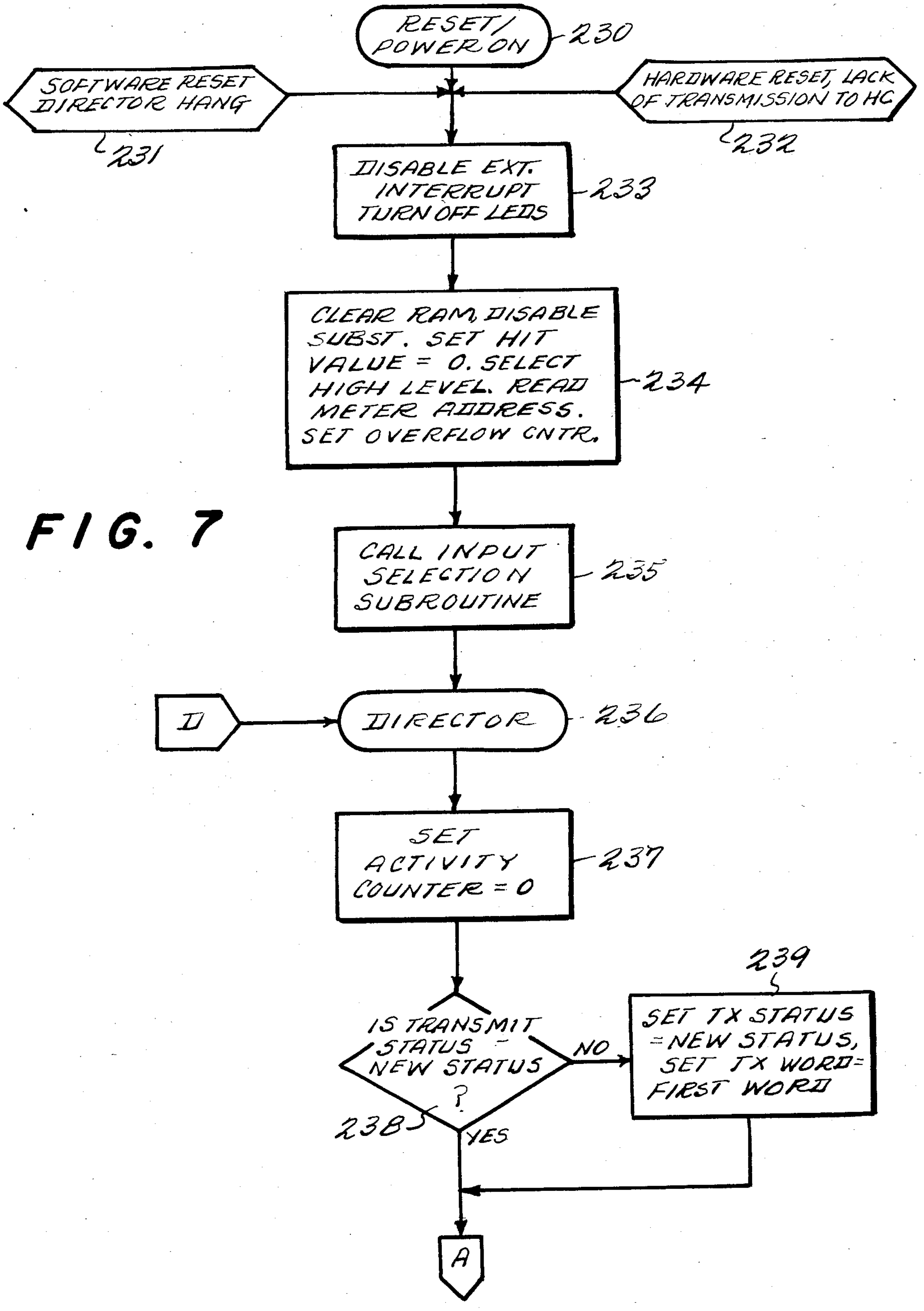
FIGS. 7–13 represent a detailed flow chart of the monitoring program of the present invention.
Figure 14:
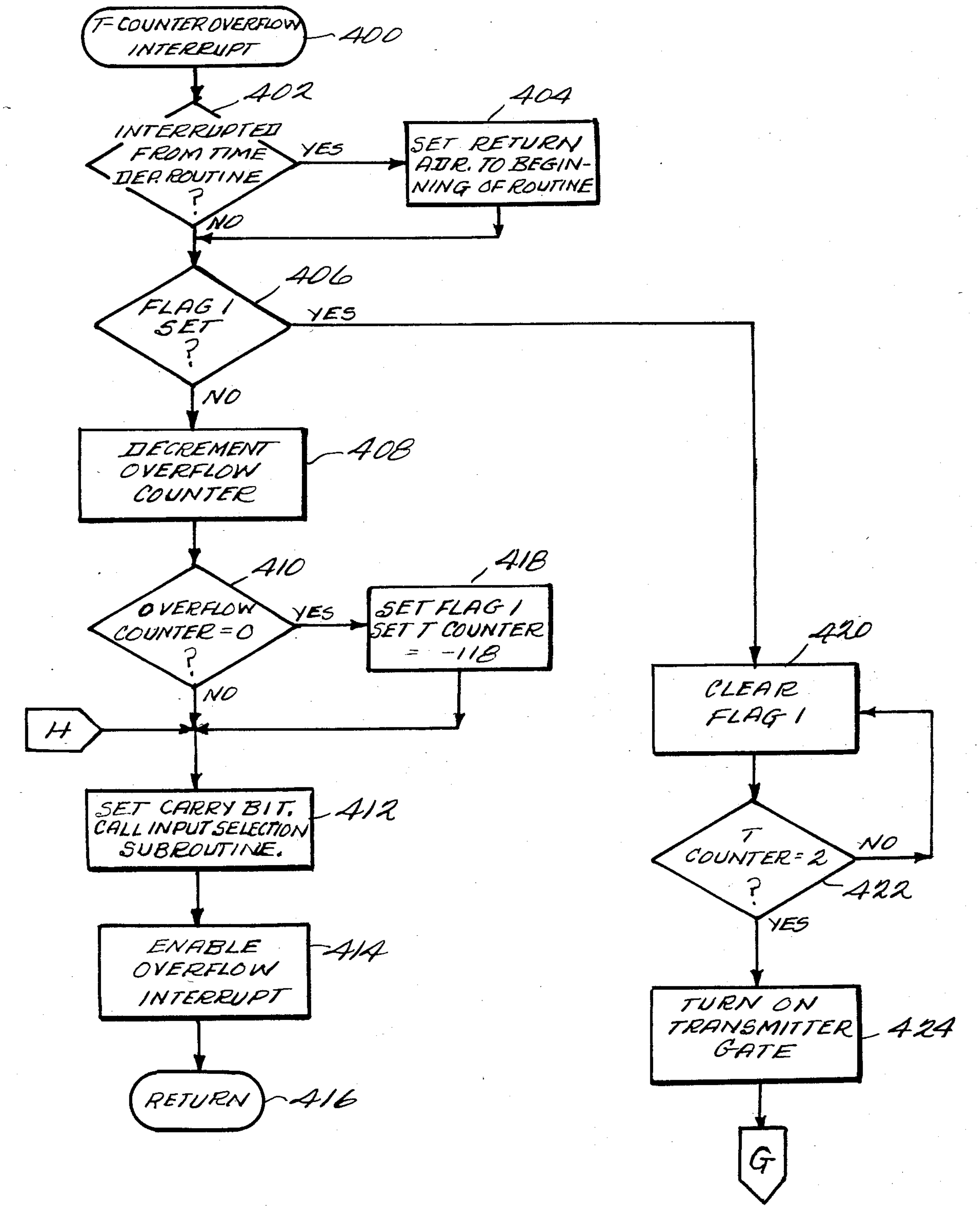
FIGS. 14 and 15 represent a detailed flow chart of the T-counter interrupt subroutine of the present invention in which data is transmitted from a cable meter to a central collector.

Turning now to FIG. 7, the program starts with a reset. This reset can occur when power is turned on as indicated at step 230. Alternately, reset can occur as caused by either hardware, as indicated in step 232, or software, as indicated in step 231. Reset circuit 192 in FIG. 4 causes the hardware reset while a variable stored in a register called "activity counter" causes the software reset. The operation of the activity counter register will be described in greater detail with respect to the T-counter interrupt subroutine illustrated in FIGS. 14 and 15. Essentially, however, each time data is transmitted, the activity counter is incremented and each time the main loop of the program is executed, the activity counter is reset. If the activity counter reaches a predetermined level, it means that the main loop of the program is not being executed so that the interrupt subroutine issues a command to reset microcomputer 170.

After the reset, the program is initialized in steps 233 and 234. Thus, in step 233, the external interrupt is disabled to prevent the program from being interrupted through the external interrupt pin of microcomputer 170. In step 234, the RAM within microcomputer 170 is cleared to reset the sample count, consecutive good pass count, and good pass count (all of which will be later described) to zero. The substitution signal from frequency synthesized oscillator 154 is disabled since oscillator 154 generates a random frequency when the system first starts up. The register "hit value" is set to zero. Also, microcomputer 170 deactivates attenuator 156 so that signals generated by oscillator 154 are not attenuated. Thus, the signal applied to converter 104 from oscillator 154 will initially be at a high level. The meter address is read from installer switches 168. This is a code by which the particular cable meter 108 will identify itself to a household collector. Finally, a counter called "overflow" is set to a predetermined number to fix the interval between data transmissions as will be described in more detail below with respect to FIGS. 14 and 15. This particular number is also set with installer switches 168. Attaining a certain value in the overflow counter register causes the execution of the interrupt subroutine illustrated in FIGS. 14 and 15.

Figure 16:
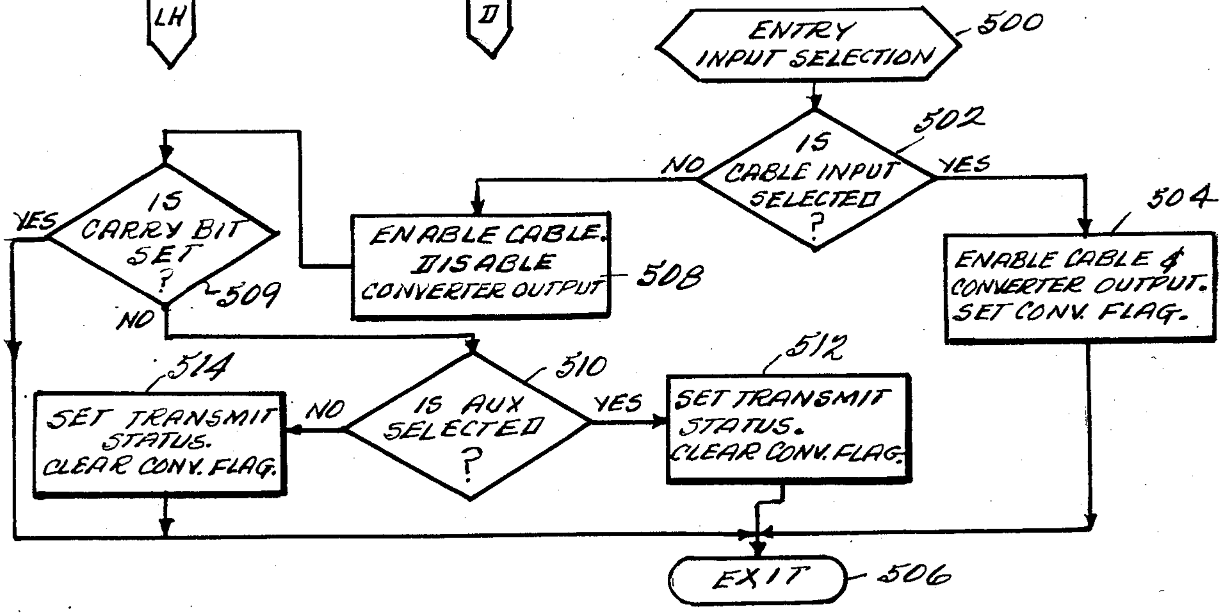
FIG. 16 represents a flow chart of the input selection subroutine of the present invention.

In step 235, microprocessor 170 calls the input selection subroutine which is illustrated in FIG. 16 and which will be described in more detail hereinafter. Generally, this subroutine determines whether cable meter 108 is set to receive cable signals or signals from the auxiliary 1 input or auxiliary 2 input.

Step 236 represents the top of the loop for all search cycles as will become apparent from the following description. This step is entitled "director".

The activity counter register is set to zero at step 237. As indicated briefly above, this counter is incremented whenever a transmission is made to a household collector. It is set to zero every time a pass is made through the main loop of the program. If the activity counter counts up too high (to 32 in the preferred embodiment) before being reset, then the system is alerted to the fact that the program is "hung up" on a particular routine, so that the software is reset from step 231. Additional details of this aspect of the invention are described with respect to FIGS. 14 and 15 hereinbelow. In step 238, the program inquires whether the data in the transmit status register is the same as the last identified channel as stored in the register "new status". If it is not, then the transmit status register is set to the new channel status register data in step 239 and also the transmit word is set to the first word of the transmission.

Figure 8:
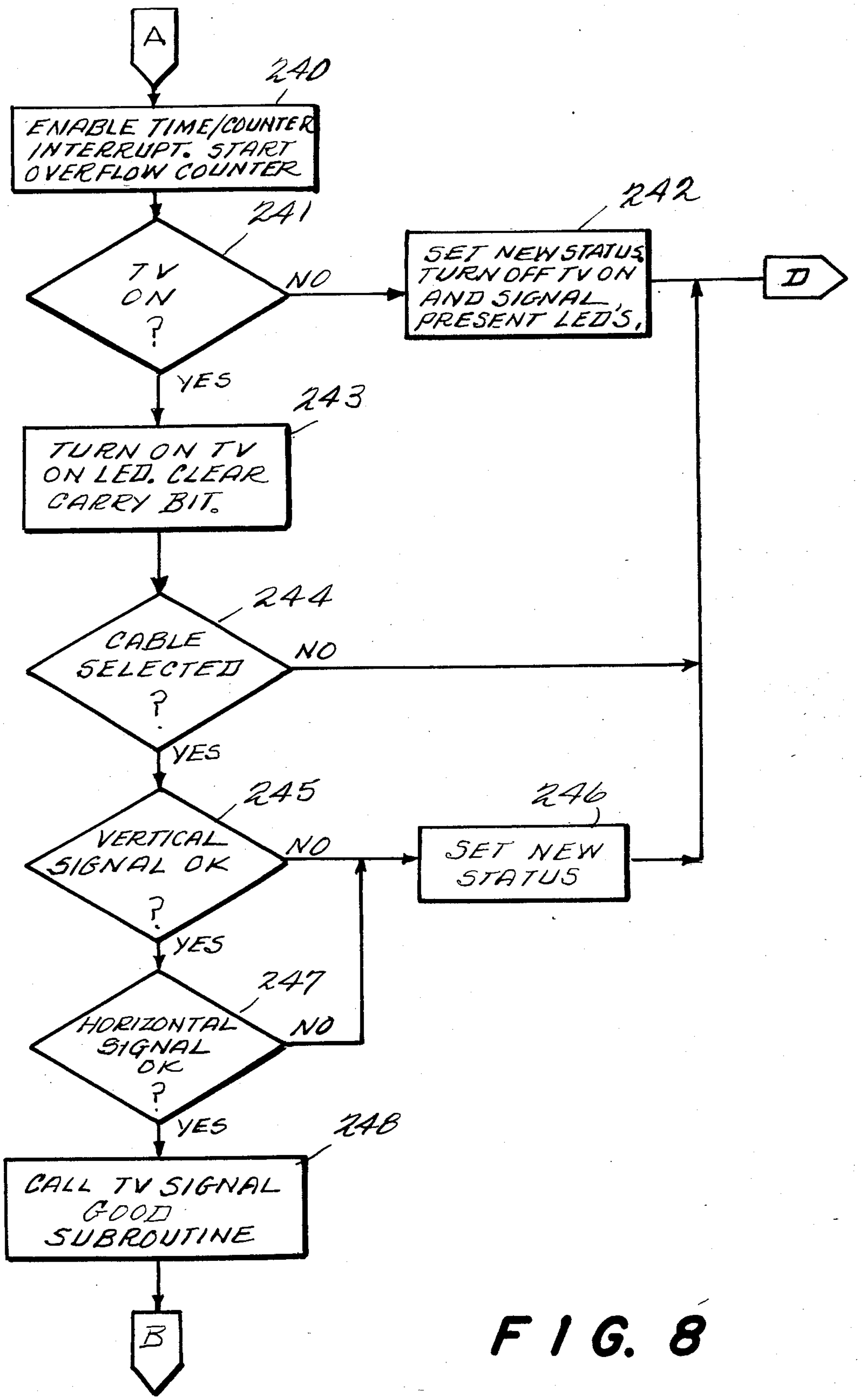

In step 240, in FIG. 8, the T-counter is enabled and incrementing of the counter is started. As will be explained below with respect to FIGS. 14 and 15, the T-counter, together with the overflow counter, time the data transmission intervals. Note that once the T-counter is started on the first pass, it does not need to be restarted on each pass through step 240. Instead, step 240 ensures that it continues to run while the program is running.

At the next step 241, microcomputer 170 determines whether television 106 is on. This is accomplished through the television current sensing circuitry 150 which generates a signal onto data bus 178. If television 106 is not on, the program moves to step 242 in which the transmission status is set to indicate that the television is off and the TV on and signal present LEDs are turned off. After step 242, the program returns to director 236 in FIG. 7.

If microcomputer 170 determines that television 106 is on in step 241, microcomputer 170 moves to step 243 and turns on the TV on LED and clears the carry bit which will later be described with respect to the input selection routine of FIG. 16. In step 244, microprocessor 170 determines whether switch 164 in FIG. 3 is set to select signals coming from cables 100 and 102 by accessing the input selection routine of FIG. 16 (later described). If the cables are not selected, indicating that either the auxiliary 1 or auxiliary 2 input has been selected, the program returns to director 236. If it is determined in step 244 that cables 100 and 102 have been selected, microcomputer 170, in steps 245 and 247 determines whether the vertical and horizontal oscillator signals generated by receiver 144 are acceptable and related to a possible television signal. These oscillator signals will be employed by microcomputer 170 to determine the proper substitution point for the frequency substitution signals. If either of these signals are not acceptable, step 246 of the program sets the transmission status to so indicate and the program returns to director 236.

Figure 9:
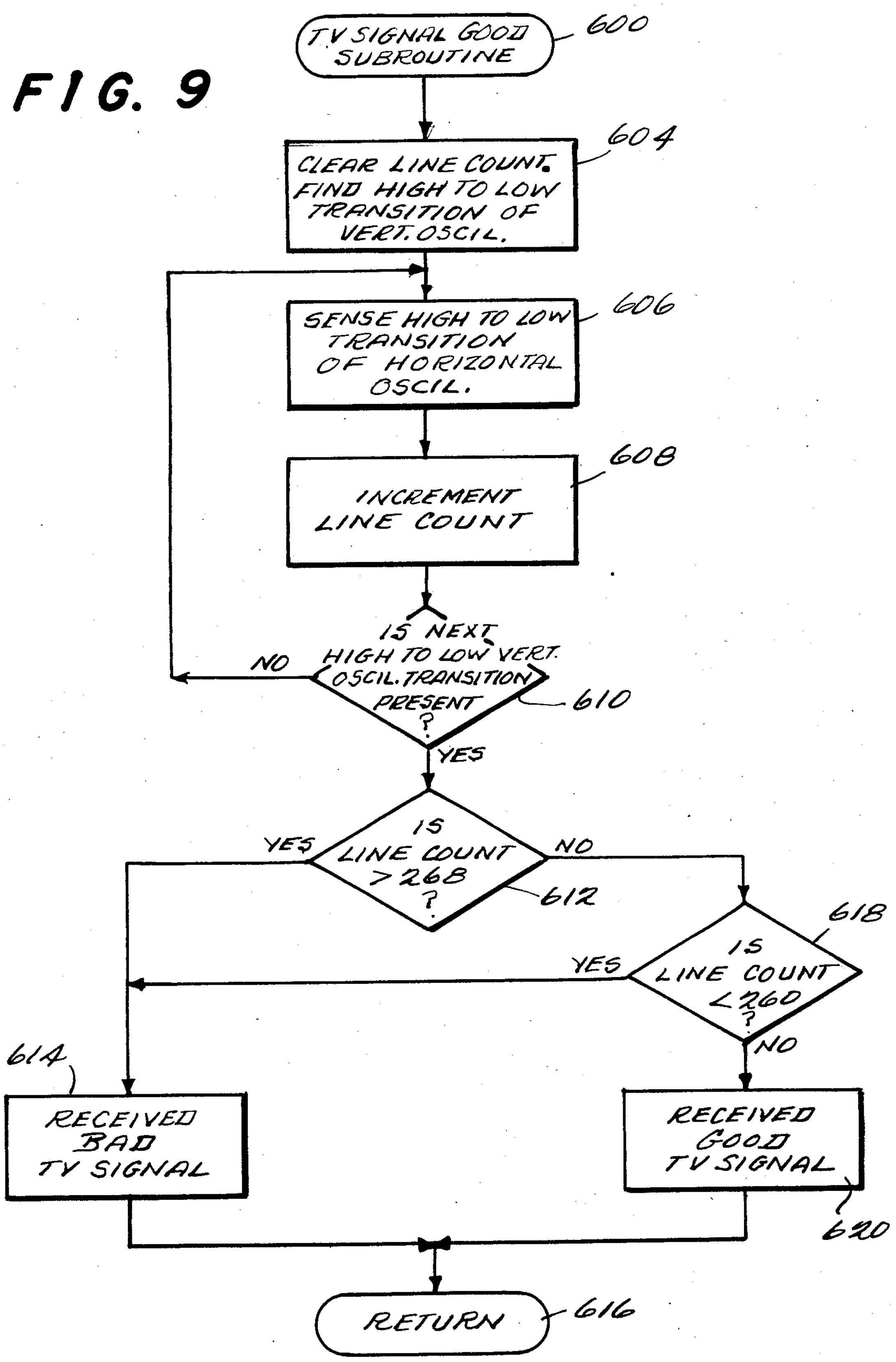
Figure 10:
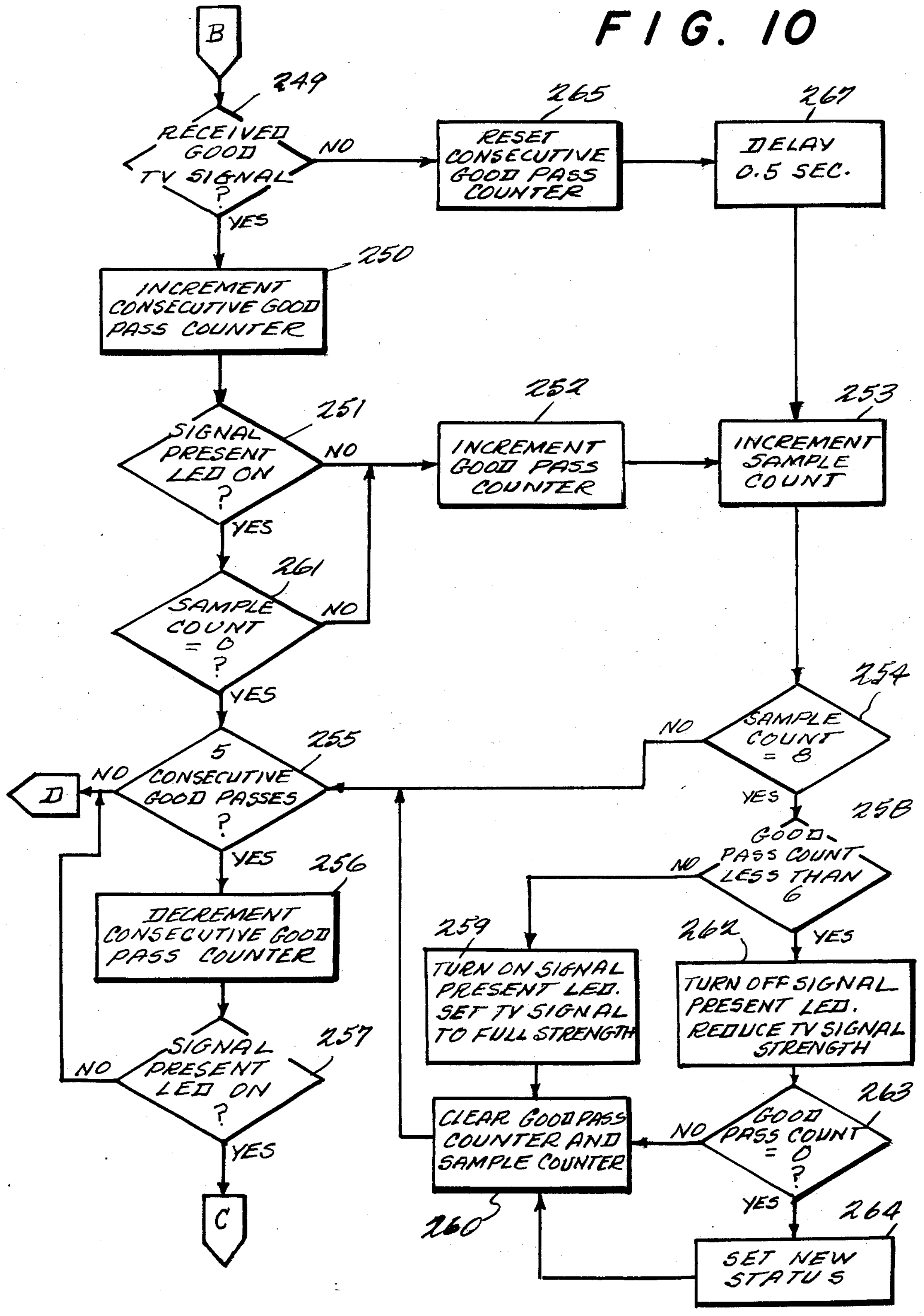

If both of the signals are working properly, microcomputer 170 calls the TV signal good subroutine in step 248. The TV signal good subroutine is shown in FIG. 9, and once initiated in step 600, moves to step 604 where the horizontal line count is cleared to zero, and microcomputer 170 finds the next high to low transition of the vertical oscillator signal. When the transition is found, the program moves to step 606 where microcomputer 170 senses the first high to low transition of the horizontal oscillator signal. This transition should represent the first horizontal line of the TV picture. Once this first transition is found, the horizontal line count is incremented to 1 in step 608. In step 610, microcomputer 170 determines whether the next high to low transition of the vertical oscillator signal has arrived. There are approximately 262 horizontal lines in a TV picture between vertical oscillator high to low transitions. Therefore, the program will return to step 606 from step 610 on this first pass. Steps 606–610 are repeated, incrementing the line count on each pass, until the next vertical oscillator transition is sensed at step 610. At step 612, if the horizontal line count is greater than 268, the program moves to step 614 where a bad TV signal indication is generated. If the count is less than 268, step 618 determines whether the line count is less than 260. If yes, again a bad TV signal indication is generated at step 612. If no, then the line count is between 268 and 260 and this is considered to be a good TV signal. A good TV signal indication is generated at step 620 and the program returns through step 616 to step 249 of the main program, FIG. 10. Assuming, first, that a good TV signal indication is present at step 249, the consecutive good pass counter is incremented from 0 to 1 in step 250. At step 251, the inquiry of whether the signal present LED is on is answered no, and the good pass counter is incremented from 0 to 1 in step 252. The sample count is incremented from 0 to 1 in step 253. Step 254 inquires whether the sample count is 8. The answer is no and step 255 inquires whether the count of the consecutive good pass counter is five. The answer is no, so the program returns to director step 236. From step 236, the program again cycles through the steps leading up to step 249 and assuming a good signal indication, the program moves through the steps 250–255 again incrementing the three counters. This cycle repeats itself until the count of the consecutive good pass counter is 5. Then step 256 decrements the count to 4, the inquiry of step 257 as to whether the signal present LED is on is answered no, and the program returns to director 236. The cycle repeats itself until the sample count is 8, at which time step 258 inquires whether the good pass count is less than 6. If we assume no (i.e., that at least 6 of the 8 samples were good), the signal present LED is turned on in step 259 (the TV signal is set to full strength—no attenuation) and the good pass counter and sample counter are cleared to zero in step 260. At step 255 the inquiry is whether the consecutive good pass counter is 5. We will assume that it was incremented from 4 to 5 on the last pass through step 250 so that the answer is yes. At step 256, the counter is decremented back to 4. At step 257, the inquiry of whether the signal present LED is on is answered yes (since it was turned on at step 259). Hence, before passing this point in the program 6 of the last 8 samples, and the last 5 consecutive passes must have resulted in good signal indications from the TV signal good subroutine of FIG. 9.

If the answer at step 258 is yes (less than 6 of last 8 samples were good), the signal present LED is turned off and the microcomputer connects switch 140 to attenuator 142 to degrade the signal to cause the viewer to attempt to tune it in better. Step 263 inquires whether the good pass count is 0. If no, the program returns to the director 236 through steps 260 and 255. If yes, step 264 updates the transmission status to indicate that no signal is being received before returning to director 236 through steps 260 and 255.

If, at any time, a bad TV signal indication is detected at step 249, the consecutive good pass counter is set to zero at step 265 and a ½ second delay is introduced at step 267 before the program moves to step 253. The ½ second delay allows the horizontal line counting circuitry time to self-correct after a bad signal indication.

To summarize the foregoing, this portion of the TV signal testing program, comprised of steps 248–267 sets the following criteria:

(1) 6 of the last 8 samples and the last 5 consecutive samples must be good before the program can progress beyond this point to the channel searching portion of the program (later described);

(2) 6 of the last 8 samples must be good or the signal to the viewers TV set will be attenuated to attempt to force the viewer to tune in the signal better; and (3) at least 1 of the last 8 samples must be good or an indication that no signal is being received will be generated.

Figure 11:
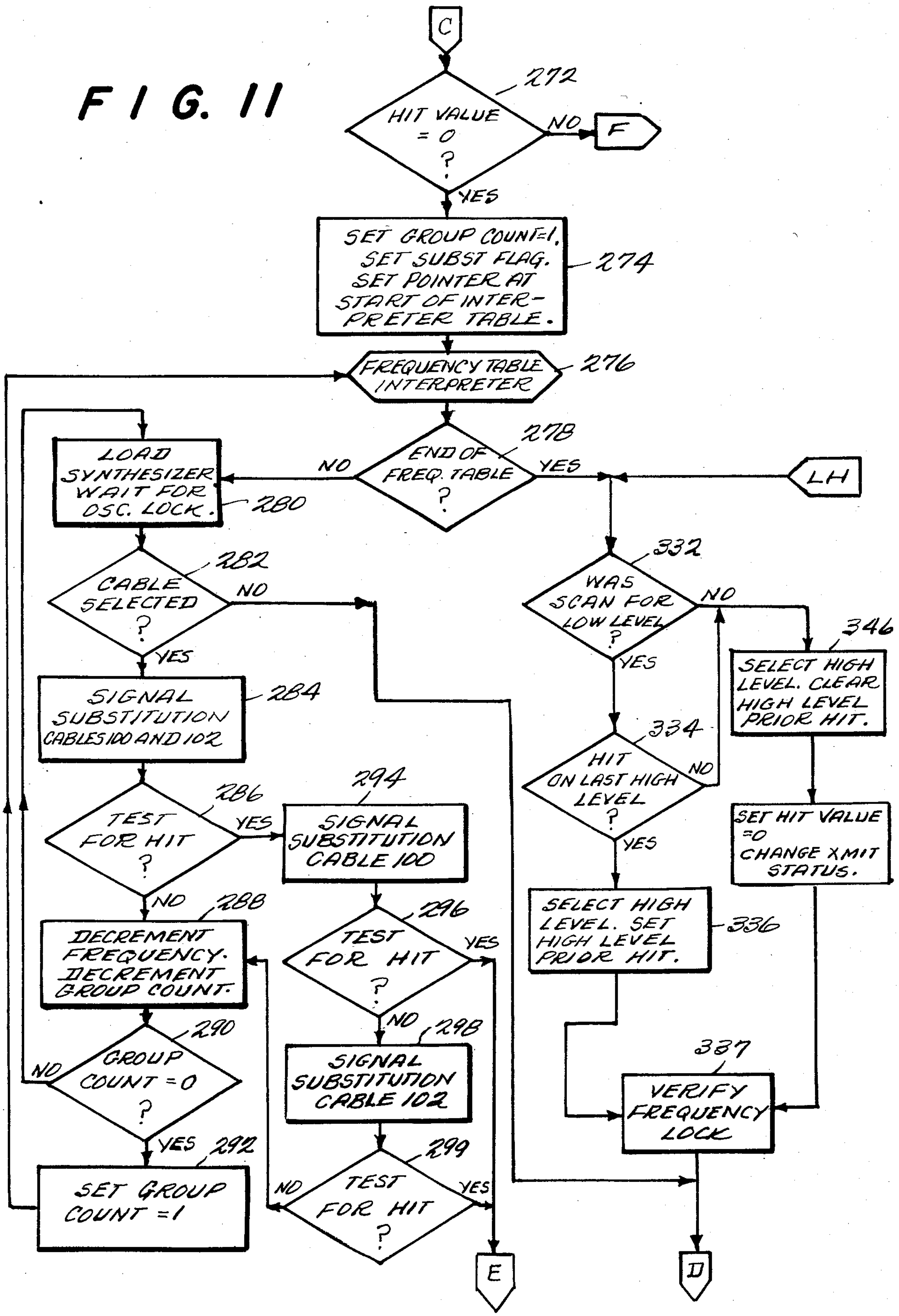
Figure 12:
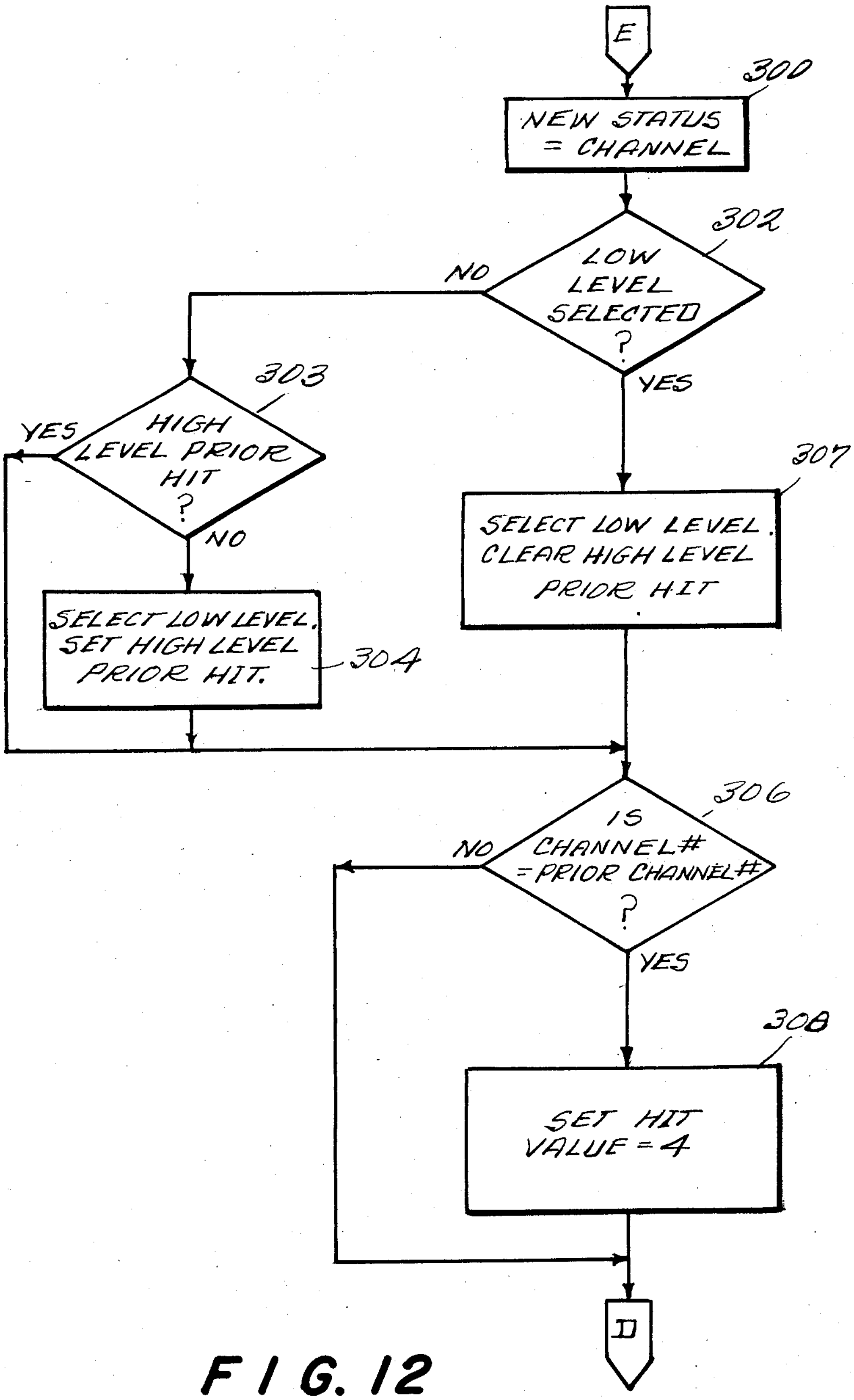

Once the program passes step 257, it moves to step 272, FIG. 11, in which the hit value register is examined. Since this is the first run through the program, the hit value will be zero since it was set to zero at step 234. Accordingly, microcomputer 170 will next execute step 274.

At step 274, the group count is set to one, in that the program initially assumes that the first group of frequencies to be retrieved from the table of frequencies will include one frequency. In the presently preferred embodiment, the number of frequencies within each group can vary between one and thirty-one frequencies. Indications of frequencies stored in the table of frequencies are retrieved in groups to minimize the amount of memory required to store the frequency table. For example, if we assume that a group of frequencies consist of ten frequencies, only the highest frequency in the group and the group count of ten must be stored. Once the highest frequency has been substituted, the frequency indication is then decremented by a fixed value, for example 6 MHz, and the group count is reduced to nine. At each successive substitution the frequency is again decremented. When the group count reaches zero, the program returns to the table to get the next higher frequency and the next group count. This procedure is explained in more detail below. Returning to step 274, a substitution flag is also set, indicating that a mode of operation is being entered in which signal substitutions can be made. Finally, a pointer is set to indicate the start of the interpreter table. At step 276, a frequency table interpreter looks to the pointer to determine which group of frequencies are to be selected next. Since this is the first pass through the program, the first group of frequencies will be selected and we will assume that this group will consist of ten frequencies. At step 278, microcomputer 170 monitors for the end of the frequency table. Since this is the first pass, the answer will be negative so that the program advances to step 280.

At step 280, frequency synthesized oscillator 154 is commanded to generate a substitution signal having a frequency corresponding to the first indication in the group obtained from the table which, in this case, corresponds to the highest frequency in the table. Microcomputer 170 then waits for oscillator 154 to lock on the selected frequency. Step 282 determines whether or not switch 164 is still set to select the cables. If the selection has changed, the program returns to the director step 236.

If, at step 282, it is determined that switch 164 is still set to its cable position, the substitution signal is provided to converter 104 on both channels at step 284. Thus, microcomputer 170 causes switches 130, 132 and 140 to momentarily open, while switches 158 and 160 momentarily close. At step 286, it is determined whether a "hit" has been made (i.e., whether oscillator 154 has generated a frequency to which converter 104 has been set). When a hit occurs, amplifier 134 receives a signal from cable converter 104, which signal passes through bandpass filter 136, splitter 138 and is applied to single channel receiver 144. Receiver 144 causes a sampling signal to be generated which is applied to microcomputer 170. If a hit has not occurred, step 288 causes the frequency to which frequency synthesized oscillator 154 is set to be decremented by a fixed frequency (6 MHz in the preferred embodiment) to the next highest frequency in the first group. The group count which initially indicates the number of frequencies in each group retrieved from the frequency table, is decremented to indicate the number of frequencies left in the group. At step 290, it is determined whether the group count is equal to zero. Since the first group taken from the table was assumed to consist of ten frequencies, the group count will equal nine. Since the group count is not equal to zero, microcomputer 170 returns to step 280 where the decremented frequency is loaded into oscillator 154. Assuming no hit occurs, the program makes nine more passes through steps 280 through 290 until the group count is equal to zero. When the group count does equal zero, the computer moves to step 292 where the group count is reset to one before the program returns to the frequency table interpreter at step 276. The next group of frequencies is then taken from the table as determined by the pointer which moves progressively along the table. The program again moves to step 278 to determine whether the end of the table has been reached. Assuming that the end of the table still has not been reached, the program moves through steps 280, 282, 284 and 286.

When step 286 indicates a hit has occurred, it is next necessary to determine whether the hit has occurred on cable 100 or cable 102. This is accomplished at steps 294 through 299. At step 294, the same signal which caused the hit is substituted only on cable 100. Thus, microcomputer 170 causes switches 130, 132 and 140 to momentarily open and only switch 158 to momentarily close. At step 296, it is determined whether a hit has occurred, i.e., whether receiver 144 generates a sampling signal. If a hit has occurred, then converter 104 has been set to receive a channel from cable 100. If a hit has not occurred, then the program progresses to step 298 which causes the same substitution signal to be applied only to cable 102. Thus, switches 130, 132 and 140 are momentarily opened and only switch 160 is momentarily closed. At step 299, it is determined whether a hit has occurred. If a hit has occurred, then converter 104 is set to receive a channel on cable 102. If a hit does not occur at either step 296 or 299, the program moves to step 288 and continues on as if a hit has not occurred.

Assuming that a hit occurs either at step 296 or 299, the transmission status is updated at step 300 (FIG. 12) to preliminarily indicate that the channel to which the converter is tuned has been found.

It is necessary to test for hits occurring during two consecutive searches. Thus, at step 302, succeeding step 300, it is determined whether the frequency substitution signal generated by oscillator 154 has been at a high or a low level. Since attenuator 156 was set in step 234 (FIG. 7) to generate a high level, the determination at step 302 will initially be negative. This causes the program to progress to step 303, at which the level of the prior hit is examined. Since this hit is the first hit, there was no prior hit so the program progresses to step 304 which causes microcomputer 170 to actuate attenuator 156 to produce low level frequency substitution signals. Also, a register entitled "high level prior hit" is set. Control then proceeds to step 306 wherein the channel selected by converter 104 is compared to the channel indicated by the prior hit. Since no prior channel had been selected, this determination is negative so that the program moves back to director 236.

Assuming that converter 104 remains tuned to the same channel identified at the high level, microcomputer 170 will execute the appropriate steps 236 (FIG. 7) through 274 (FIG. 11) where the pointer will again be set to the start of the frequency interpreter table. Microcomputer 170 again executes steps 276 through 292 (FIG. 11) to search for a hit. Once a hit is found, the program progresses through steps 294 through 299 to determine whether converter 104 is set to a channel on cable 100 or cable 102. Thereafter, the program again updates the channel status at step 300 and moves to step 302.

Note that a search is made on this second pass with the frequency substitution signal at a low level to eliminate the problem of identifying submultiple frequencies. Suppose oscillator 154 generates a fundamental frequency of 216 MHz and a submultiple frequency of 108 MHz. The fundamental frequency will have a much stronger component than the submultiple frequency. If converter 104 is set to receive signals at 108 MHz, receiver 144 may very well generate a sampling signal based on the submultiple when frequency substitution signals are at a high level. However, the chances are greatly improved that receiver 144 will not generate a sampling signal when the frequency substitution signals are set at a low level.

At step 302, it will be determined that the low level has been selected. Accordingly, control passes to step 307 at which the low level is selected, or reselected, and the high level prior hit register is cleared.

Next, step 306 determines whether the channel just identified is the same as the channel identified in the first search. If the channels are the same, as they should be during normal operation, we have a high level hit followed by a low level hit at the same frequency. As a result, microcomputer 170 next executes step 308 at which the hit value is set to four. The program then returns to director 236 in FIG. 7.

At this point, the channel to which converter 104 is set has been preliminarily identified at the high level and confirmed at the low level, and the hit value has been set to four.

The program again executes the appropriate steps 236 (FIG. 7) through 272 (FIG. 11). At step 272, it is determined that the hit value is not equal to zero. Accordingly, computer 170 executes the steps illustrated in FIG. 13. At step 310, the hit value is decremented to three. At step 312, it is determined whether the last hit indicates that converter 104 is set to receive a channel on cable 102. If the last hit indicated that converter 104 was set to receive signals from cable 100, this determination is negative so that control passes to step 314. At step 314, cable 100 is selected, switches 130, 132 and 140 are momentarily opened and switch 158 is momentarily closed to enable substitution of the frequency substitution signal at the same frequency as the last hit on cable 100. At step 318, it is determined whether a hit has occurred at the same frequency. If a hit has occurred, step 320 verifies the transmission status to indicate cable 100 and the channel of cable 100 which has been selected by converter 104. As will become apparent below, now that the channel has been verified, the program will move into a shortened program cycle which avoids the searching steps 274–300, at least until the channel is lost.

After verifying the channel status at step 320, the frequency substitution signal is disabled at step 322 and the hit value is again set to four. Thereafter, the program returns to director 236 (FIG. 7). Of course, if the hit had occurred on cable 102 instead of cable 100, steps 324 through 330 in FIG. 10 would have executed corresponding operations.

In some cases, after getting a hit at the high level, it will not be possible to get a hit at the low level. As a result, on the second pass, the searching performed by steps 276 through 292 (FIG. 11) will cause the entire frequency table to be accessed. After the last frequency has been accessed, the determination of whether the end of the table has been reached will be positive in step 278. Microcomputer 170 will next execute step 332 in which the level of the last scan is examined. Since the last scan was at a low level, processing will proceed to step 334 where it will be determined whether the last hit was at a high level. Since, in this situation, a high level hit was followed by no hit at a low level, the determination at step 334 will be positive so that control will proceed to step 336 at which a high level for the frequency substitution signal will be selected and the high level prior hit register will be set. At step 337, microcomputer 170 will wait for oscillator 154 to lock (if it is not locked) before returning to director 236 (FIG. 7).

The program then moves through steps 236 through 272 (FIG. 11). At step 272, since the hit value remains equal to zero as set by step 234 (step 308 (FIG. 12) has not yet been executed since the second, low level search produced negative results), step 274 is executed.

The program then searches by repeatedly executing steps 276 through 292 until a hit is made at the high level. When a hit occurs, the program executes steps 294 through 299 to determine which cable the hit is on. At step 300 the channel status is updated.

At step 302 (FIG. 12) a determination is made as to whether the hit occurred at a low level. Since the hit did not occur at a low level, the program advances to step 303 to determine whether the prior hit was at a high level. In this situation, the prior hit was at a high level so control advances to step 306 to determine whether the channel identified on this pass is the same as the channel identified on the first pass. If the channel identified on this high level is the same as was identified on the first high level pass, then step 308 is executed, setting the hit value to four.

Thereafter, the program returns to director 236 and proceeds through step 272 (FIG. 11). Since the hit value is not equal to zero, step 310 (FIG. 13) is executed next. Assuming the hit occurred on cable 100, the hit is verified at step 318 and the transmission status is verified at step 320.

Thus, where a channel is first identified at a high level, but cannot be identified at a low level, if a hit can again be made at a high level on the same channel as a result of a search (actually twice at the high level at steps 286 and 296 in FIG. 11), and can then be confirmed at a high level at step 318 (FIG. 13), the channel status will be verified at step 320.

A third possible mode of channel identification exists. In this mode, a different channel is identified at the low level than at the previous high level. In this mode of channel identification, it is assumed that a first hit occurs at a high level and a second hit occurs at a low level, but on a different channel. During the first pass, steps 302, 303, 304 and 306 (FIG. 12) are executed before returning to director 236. On the second pass, the determination at step 302 is positive so that at step 307, the low level is selected and the high level prior hit register is cleared. At step 306, the determination is negative so that the program returns to director 236.

If, during the next pass, a channel is identified as a result of a search (steps 276–292 in FIG. 11) which is the same as the channel identified in the preceding low level pass, then the determination at step 302 that a low level was selected is positive and the determination at step 306 that the present channel is the same as the prior channel is also positive. Therefore, the program proceeds to step 308 where the hit value is set to four before returning to director 236. During the next pass through the program, at step 272 (FIG. 11) the hit value does not equal zero so that the program proceeds to FIG. 13, and assuming another hit at step 318 or 328, the channel status is verified in step 320 or 330.

Accordingly, the three modes of channel identification can be summarized as follows:

(1) If consecutive high level and low level searches identify the same channel, the hit is valid. (high hit—low hit identifying mode)

(2) If a hit is not found during a low level search after a hit had been found during a high level search, a search is performed at a high level. If a high level hit indicates the same channel as the previous high level hit, the hit is valid. (high hit—low miss—high hit identifying mode)

(3) If a hit is found during a low level search on a channel different from that indicated during a previous high level search, a low level search is repeated. If a hit is found at the low level on the same channel as the previous low level hit, the hit is valid. (high hit channel x—low hit channel y—low hit channel y identifying mode)

Figure 13:
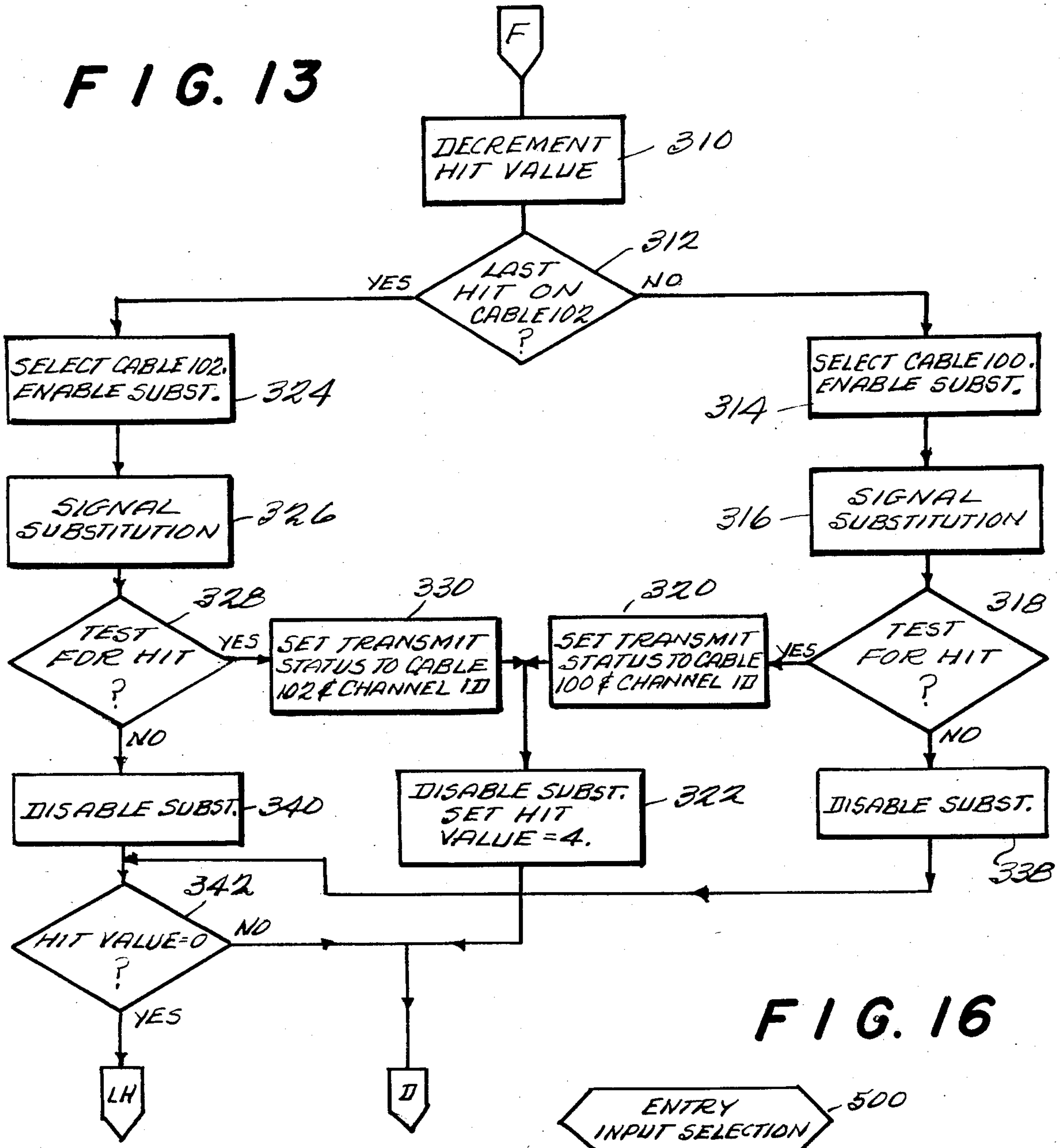

Once the channel has been verified in one of the three modes described, the program cycles from director 236 through the appropriate steps to step 272 and then through the appropriate steps 310 through 330 of FIG. 13. In this shortened cycle, the program avoids the search sequence of steps 274–300. This cycling continues until the channel selected by converter 104 is changed. Hence, while the program immediately updates the channel status at step 300 to preliminarily indicate that the channel has been found after the first hit at step 296 or 299, the channel must be confirmed in one of the three modes described before the program moves into the shortened program loop which avoids the scanning procedure of steps 276–292.

Once the channel is changed, the inquiry at step 318 or 328 (FIG. 13) will be negative. As a result, step 338 or 340 will disable the substitution of the frequency substitution signal and step 342 will determine whether the hit value is zero. In step 310, the hit value had been decremented to three. Therefore, the program will return to director 236 following step 342.

On the next pass through the program, the hit value will be decremented to two in step 310, and if there is another miss at step 318 or step 328, the program will again return to director 236. If misses occur on the next two successive passes through step 318 or step 328, the hit value will equal zero so that the program will move from step 342 to step 332 (FIG. 11).

At step 332, the level of the last scan is examined. If it is assumed that the channel was determined based on a high hit-low hit identification mode, or the high hit channel x, low hit channel y, low hit channel y identification mode, the determination of step 332 will be positive so that the program will move to step 334. Here, the determination will be negative since the high level prior hit was cleared at step 307 (FIG. 9). Accordingly, the program will move to step 346 where a high level for the frequency substitution signal will be selected for the next pass and the high level prior hit register will be cleared. At step 348, the hit value is set to zero and the transmit status is to be changed to indicate that the channel has been lost. The program returns to director 236 through step 337.

Hence, once the channel has been identified, four consecutive misses at step 318 or 328 (FIG. 13) are required before the transmit status is changed to indicate that the channel has been lost.

If the channel was identified according to the second mode described (high hit, low miss, high hit), and four consecutive misses bring the program to step 332, step 332 will determine that the scan was not for a low level, so that the program proceeds to step 346. Again, the transmission status will be updated in step 348 to indicate that the channel has been lost before the program returns to director 236. Hence, the program is designed so that after identifying a channel, microcomputer 170 will not change the channel status until after four consecutive misses.

At step 240 in FIG. 8, the T-counter was both enabled and started. After a predetermined time, (in the presently preferred embodiment 256 counts) the T-counter overflows. This initiates the interrupt subroutine illustrated in FIGS. 14 and 15. The purpose of this interrupt subroutine is to transmit the data collected by cable meter 108.

Thus, with the initiation of the T-counter overflow interrupt subroutine at step 400, the program proceeds to step 402. At step 402, it is determined whether the interrupt routine was initiated during a time dependent routine such as the testing of the vertical and horizontal signals in steps 245 or 247 (FIG. 8). If a time dependent routine has been interrupted, the return address for the interrupt routine is set to the beginning of the time dependent routine in step 404. After step 404, or if no time dependent routine was interrupted, the program advances to step 406 where it is determined whether flag 1 is set. In the first pass through the interrupt subroutine, the flag is not set so that the program advances to step 408 which causes the overflow counter to be decremented. It will be recalled that the overflow counter was initially set to a predetermined number in step 234 (FIG. 7). It is also important to note that the overflow counter is different from the T-counter.

After decrementation of the overflow counter in step 408, step 409 determines whether the overflow counter is equal to zero. During the first pass through the program, the overflow counter will not be equal to zero so that the program advances to step 412, in which the input section subroutine is called and the carry bit (later described) is set. Step 414 re-enables the overflow interrupt (since it becomes disabled as soon as the T-counter overflows). Step 416 returns the program to the point of the main program from where it was interrupted.

When the T-counter again overflows the interrupt subroutine will be re-executed so that the program moves through steps 402, possibly 404, 406, 408 to 410. During the second pass through the interrupt subroutine, the overflow counter will still not be equal to zero so that the program continues through steps 412, 414 and 416. Eventually, enough passes through the interrupt routine will have occurred so that the overflow counter will be decremented to zero. During this pass through the interrupt subroutine, a determination will be made at step 410 that the overflow counter is equal to zero. At step 418, flag 1 is set and the T-counter is set to −118. The program then moves through steps 412, 414 and 416.

At the next interrupt caused by the overflow of the T-counter (the T-counter will have counted to 256 plus 118, the program moves to step 406 at which it is determined that flag 1 as been set. Therefore, the program advances to step 420 at which flag 1 is cleared. At step 422, the value of the T-counter is examined. Note that upon overflowing, the T-counter begins counting again. The program cycles through steps 420 and 422 until the T-counter equals 2 so that the program becomes synchronized with the system clock. The program moves on to step 424 at which the transmitter gate is turned on.

Figure 15:
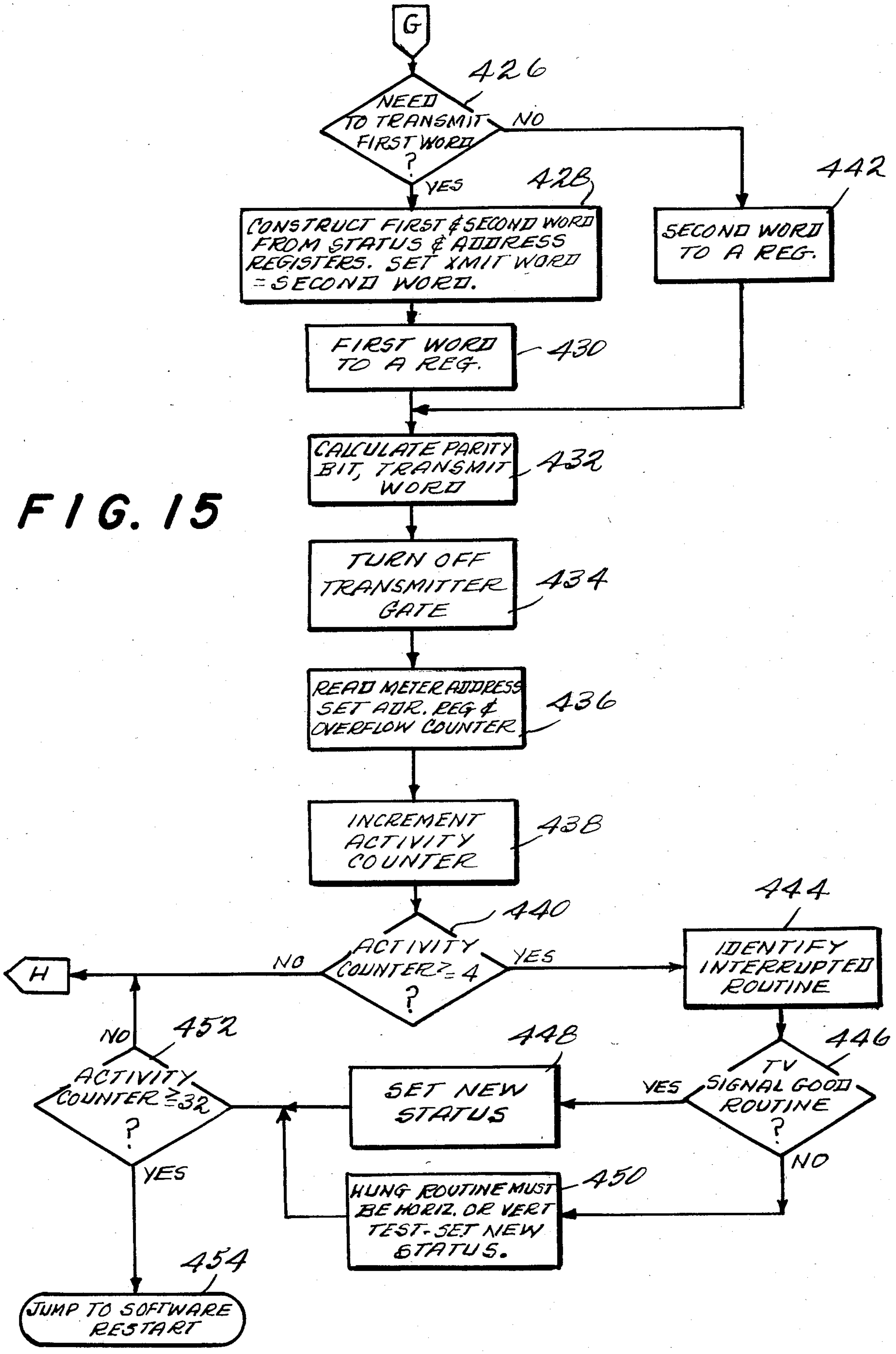

As illustrated in FIG. 15, at the next step 426, it is determined whether the first word needs to be transmitted. In step 239 we set the transmit word equal to the first word. Therefore, this determination is positive. Accordingly, the program advances to step 428 in which the first and second words are constructed from the transmission status and the address registers and the transmit word is set to equal the second word. Each channel on each cable is identified by an eight bit code. Two eight bit words, each carrying four bits of the code, are required to transmit the eight bits code to the household collector. Each of the eight bit words include three bits of meter identification information in addition to the four bits of channel code information. The remaining bit in each word indicates whether it is the first or second word of the sequence. The control logic transmits approximately one word every two seconds to the collector. Consequently, two separate transmissions, taking approximately four seconds, are required to transmit one complete channel identification code to the collector.

Step 430 stores the first word in register A. Then, in step 432, the parity bit is calculated and the word is transmitted.

In step 434, the transmitter gate is turned off. In step 436, the identification of the cable meter 108 doing the transmitting is read again, the address register is set with this identification and the overflow counter is reset.

In step 438, the activity counter is incremented, and in step 440, the activity counter value is checked. Since this is the first pass through step 438 and 440, the activity counter will be equal to one, so that the program proceeds through steps 412, 414 and 416 (FIG. 11) before returning to the main program.

Over the next T-counter overflow interrupts, the program repeatedly moves through steps 400 through 416 until the overflow counter again equals zero at step 410. This causes flag 1 to be set in step 418, and at the next overflow interrupt, the program branches at step 406 to steps 420 through 426.

At step 426, since the transmit word was set to the second word in step 428, the answer to the inquiry is negative so that the program advances to step 442 at which step the second word is stored in register A. The word is then transmitted along with the parity bit at step 432. The program then moves through steps 434 through 440, and assuming that the determination step 440 is negative, microcomputer 170 returns to the main program through steps 412 through 416.

Note that the initial value of the overflow count together with the −118 "remainder" determine the time interval between transmissions. The initial value of the overflow counter is set by installer switches 168. The −118 remainder is added to the T-counter in the preferred embodiment so that the approximate transmission interval is around two seconds. This approach allows for very accurate setting of the transmission interval.

If a hung routine develops such that the program makes several transmissions without executing step 237 (FIG. 7) in which the activity counter is reset to zero, eventually the determination at step 440 will be positive. The program will then advance to step 444 at which the interrupted routine (presumably in which the hang has occurred) will be identified. At step 446, it is determined whether this hung routine is the TV signal good routine of FIG. 9. If the hung routine is this routine, step 448 causes the transmission status to indicate this and control passes to step 452. If this routine was not causing the hang-up, the determination at step 446 is negative so that the hung routine must be either the horizontal test of step 247 or the vertical test of step 245. In either of these cases, step 452 determines whether the activity counter is greater than or equal to 32. If this determination is negative, the program returns to the main program through steps 412 through 416. If, however, the determination at step 452 is positive, the program moves to step 454 and then to step 232 to restart the main program.

Thus, the activity counter is incremented each time a transmission occurs and is reset to zero each time computer 170 executes the main program. If, at some point, a problem develops such that one of the testing routines are not properly executed, the activity counter will continue to be incremented without being reset. When the activity counter reaches a predetermined level, the software is reset.

Both the main program, at steps 235 and 44, and the T-counter overflow interrupt subroutine, at step 412 call the input section subroutine illustrated in FIG. 16. After entry at step 500, step 502 determines whether the cable input has been selected by switch 164 (FIG. 3). If it has been selected, step 504 enables the cable, causing switches 130 and 132 to be closed, and enables the converter output, causing switch 140 to be closed, and the converter flag is set. Microcomputer 170 then returns to the main program or the interrupt subroutine through exit 506.

If, at step 502, it is determined that the cable has not been selected, microcomputer 170, in response to step 508, enables the cable, causing switches 130 and 132 to be closed (some cable companies require the cable signal to constantly be applied to the converter), but disables the converter output, causing switch 140 to open. The program then moves to step 509 where the inquiry is whether the carry bit has been set. The carry bit can only be set at step 412 of the transmission routine of FIG. 14. It is cleared by step 243 of the main program. Where the carry bit is set, the program moves directly to exit step 506 without changing the transmission status. Where the carry bit has been cleared, the program moves to step 510 to determine whether Aux 1 or Aux 2 has been selected. If Aux 1 has been selected, the status is updated to so indicate at step 512 and the converter flag is cleared. If Aux 2 is selected, the status is updated at step 514 and the converter flag is cleared. Once the program has moved past step 235, the input selection routine is entered either from step 244 of the main program or step 412 of the data transmission routine. Note that just before the input selection routine is entered from step 412 of the data transmission routine, the carry bit is set in step 412, ensuring that the transmission status will not be changed in the middle of a transmission. On the other hand, just before the input selection routine is entered from step 244 of the main program, the carry bit is cleared in step 243 to allow the transmission status to be updated to indicate whether auxiliary 1 or auxiliary 2 has been selected. Note, however, that even though the transmission status is not changed when the carry bit is set, the converter output is disabled in step 508 in response to an indication from step 502 that the cable input is no longer selected.

Although only a single exemplary embodiment of this invention has been described in detail above, those skilled in the art will readily appreciate that many modifications are possible in the exemplary embodiment without materially departing from the novel teachings and advantages of this invention. For example, the presently preferred embodiment is employed with a television system which receives signals by cable through an external cable converter. Although certain advantages are inherent in this particular arrangement with respect to connecting the present invention to the converter and the television, those of ordinary skill in the art will realize the advantages of employing certain aspects of the present invention even with a television having an integral tuner which may or may not be adapted to receive cable channels. In such a case, the output of the tuner would be directed to the present invention and the output of the present invention would be connected to the remainder of the television circuitry. Furthermore, those of ordinary skill in the art would readily appreciate that certain aspects of the present invention are equally suitable for monitoring a radio receiver or any other communications receiver, whether the communications are transmitted over a cable, by electromagnetic signals through the air or over any other media.

Accordingly, all such modifications are intended to be included within the scope of this invention as defined in the following claims.

What is claimed is:

1. An r.f. channel meter for detecting which of plural available r.f. channels on an r.f. communication medium has been selected for use by an r.f. system, said meter comprising:

- a multichannel input adapted for coupling to said medium;
- a multichannel output coupled to said multichannel input and adapted for coupling to said system;
- a single channel input also adapted for coupling to said system;
- a single channel output coupled to said single channel input;
- detecting means connected to said single channel input and to said multichannel output for generating and selectively coupling substitution signals to said multichannel output and for detecting the presence of any corresponding substitution signals which may be externally coupled via said system from said multichannel output to appear back at said single channel input and thereby detecting which r.f. channel said system has selected.

2. An r.f. channel meter as in claim 1 further comprising:

- switch means connected between said multichannel input and said multichannel output for interrupting the normal passage of signals therethrough and for substituting said substitution signals at the multichannel output instead.

3. An r.f. channel meter as in claim 1 further comprising:

- switch means connected between said signle channel input and said signle channel output for interrupting the normal passage of signals therethrough at times when said substitution signals are coupled to the multichannel output.

4. An r.f. channel meter as in claim 3 further comprising:

an AC power input;

an AC power output; and current monitoring means coupling said a.c. power input to said AC power output for detecting when AC power is passing therethrough.

5. An r.f. channel meter as in claim 4 wherein said current monitoring means includes threshold means for detecting when AC power above a predetermined threshold amount is passing therethrough.

6. An r.f. channel meter as in claim 3 wherein said detecting means comprises means for coupling said substitution signals to said multichannel output during successive search operations and for detecting the presence of any corresponding substitution signals appearing back at said single channel input during at least two such search operations.

7. An r.f. channel meter as in claim 6 wherein said detecting means comprises means for selectively changing the level of the substitution signals coupled to the multichannel output during said search operations.

8. Apparatus as in claim 1 wherein said detecting means further comprises:

means for sequentially decreasing the frequency of said substitution signals from an initial high frequency; and means for reducing the level of said substitution signals after said substitution signals have been generated having a plurality of frequencies at a comparatively high level.

9. Apparatus for detecting which of a plurality of radio frequency carriers available over a radio frequency communications medium has been selected for reception by a communications system, said system including a selector, for selecting one of said carriers and a receiver, said apparatus comprising:

a multifrequency input adapted for coupling with said medium;

a multifrequency output coupled to said multifrequency input and adapted for coupling with said selector;

a single frequency input adapted for coupling with said selector;

a single frequency output adapted for coupling with said receiver; and means, interconnecting said single frequency input and said single frequency output, for detecting the carrier frequency selected by said selector.

10. Apparatus as in claim 9 wherein said detecting means includes:

means for intermittently substituting signals for said plurality of radio frequency carriers applied to said selector; and means, interconnecting said single frequency input and said single frequency output, for detecting signals from said selector related to said substituted signals to determine which of said carriers said selector has selected.

11. Apparatus as in claim 9 further comprising means for generating a confirmed indication of the carrier frequency selected by said selector, said generating means generating said confirmed indication only after said detecting means confirms at least twice the carrier frequency selected by said selector.

12. Apparatus as in claim 9 further comprising:

means for periodically confirming that said selector continues to select the carrier frequency identified by said detecting means; and means for generating an indication that said selector has selected a different carrier frequency only after said confirming means fails said confirmation on a predetermined plurality of consecutive attempts.

13. Apparatus as in claim 9 further comprising a communications receiving system for receiving radio frequency carriers transmitted over a medium wherein said multifrequency input is connected to said medium and wherein said receiving system includes:

a selector having an input connected to said multifrequency output and an output connected to said single frequency input; and a receiver connected to said single frequency output.

14. Apparatus for detecting which of a plurality of channels available over a medium has been selected for reception by a communications system, said system including a selector, coupled to said medium, for selecting one of said channels, and having an output, and a receiver for receiving a channel selected by said selector, said apparatus comprising:

means, coupling said selector to said receiver, for intermittently monitoring said selector output; and means for uncoupling said receiver from said selector during said intermittent monitoring.

15. Apparatus as in claim 14 wherein said monitoring means includes:

means, connected to said selector, for intermittently substituting signals for said plurality of channels applied to said selector; and means for detecting signals from said selector related to said substituted signals to determine which of said channels said selector has selected.

16. Apparatus as in claim 14, further comprising means for generating a confirmed indication of the channel selected by said selector, said generating means generating said confirmed indication only after said monitoring means determines at least twice that the same channel has been selected by said selector.

17. An r.f. channel meter for detecting which of plural available r.f. channels on an r.f. communications medium has been selected for use by an r.f. system, said meter comprising:

a multifrequency input adapted for coupling to said medium;

a multifrequency output adapted for coupling to said system;

means for connecting said multifrequency input to said multifrequency output;

a single frequency input also adapted for coupling to said system;

a single frequency output also adapted for coupling to said system;

means, coupled to said multifrequency output, for coupling said single frequency input to said single frequency output, and for detecting signals at said single frequency input related to signals at said multifrequency output and to thereby detect which r.f. channel said system has selected;

means for receiving power; and an AC power output coupled to said receiving means.

18. A meter as in claim 17 further comprising:

means for monitoring the current flowing through said AC power output; and means for generating an indication when said current monitoring means detects a predetermined amount of power.

19. An r.f. channel meter for detecting which of plural available r.f. channels on an r.f. communications medium has been selected for use by an r.f. system, said meter comprising:

a multifrequency input adapted for coupling to said medium;

a multifrequency output selectively coupled to said multichannel input and adapted for coupling to said system;

a single frequency input also adapted for coupling to said system;

a single frequency output coupled to said single frequency input and also adapted for coupling to said system;

oscillating means, selectively coupled to said multifrequency output, for generating substitution signals at frequencies related to frequency control signals, said oscillating means including a single fixed frequency oscillator and generating means connected to said single fixed frequency oscillator, for generating said substitution signals;

a memory for storing indications of desired substitution signal frequencies;

detecting means, connected to said single frequency input, for generating sampling signals in response to signals related to said substitution signals, and a microprocessor, connected to said oscillating means for retrieving said indications from said memory and applying signals related thereto to said generating means as said frequency control signals to select frequencies of substitution signals generated by said oscillating means to thereby determine which r.f. channel has been selected by said system.

20. Apparatus for detecting which of a plurality of radio frequency carriers available over a radio frequency communications medium has been selected for reception by a communications system, said system including a selector for selecting one of said carriers and a receiver, said apparatus comprising:

a multifrequency input adapted for coupling with said medium;

a multifrequency output adapted for coupling with said selector;

first switch means for selectively coupling said multifrequency input to said multifrequency output;

a single frequency input adapted for coupling with said selector;

a single frequency output adapted for coupling with said receiver;

second switch means for selectively coupling said single frequency input with said single frequency output;

oscillating means for generating a substitution signal at a frequency related to a frequency control signal;

third switch means for selectively coupling said oscillating means with said multifrequency output;

detecting means, connected to said single frequency input, for generating sampling signals in response to an output of said selector; and control means, connected to said first, second and third switch means and said oscillating means and responsive to said detecting means for performing the following functions:

(a) periodically, momentarily opening said first and second switch means and closing said third switch means to substitute said substitution signal for said carriers applied to said selector, (b) during the momentary period defined in said function (a), determining whether said sampling signal has been generated, (c) when no sampling signal has been generated, changing said frequency control signal and repeating said functions (a) and (b), and (d) when a sampling signal has been generated, producing an indication of the frequency of said substitution signal causing said sampling signal.

21. Apparatus as in claim 20 further comprising memory means for storing indications of predetermined frequency control signals for causing said oscillating means to generate substitution signals at desired frequencies, said control means accessing said memory means to retrieve said indications for generating said frequency control signals.

22. Apparatus as in claim 20 further comprising:

means for receiving power;

means, connected to said power receiving means, for providing power to said receiver; and means for generating an energization indication when said receiver draws power, said control means performing said functions (a)-(d) in response to said energization indication.

23. Apparatus as in claim 20 wherein said control means generates a confirmed indication of the frequency of said substitution signal only when at least two consecutive performances of said functions (a)-(d) cause said sampling signals to be generated by substitution signals having the same frequency.

24. Apparatus as in claim 20 wherein:

said apparatus further comprises attenuating means, connected to said oscillating means, for selectively reducing the level of said substitution signals, said attenuating means being controlled by said control means; and after said control means receives said sampling signal with said substitution signals not being affected by said attenuating means, said control means performs said functions (a)-(d) with said substitution signals being reduced by said attenuating means, a confirmed indication of the frequency of said substitution signal being produced when said sampling signals resulting from both performances of said functions (a)-(d) are caused by said substitution signals having the same frequency.

25. Apparatus as in claim 24 wherein:

said control means produces said confirmed indication when performance of said steps (a)-(d) is repeated at least three times, the first time with said substitution signals not affected by said attenuating means and the second and third times with said substitution signals reduced by said attenuating means, said sampling signals produced by said second and third times being generated in response to said substitution signals having the same frequency different from the substitution signal frequency causing said sampling signal in said first time; and said control means produces said confirmed indication when said control means causes said functions (a)-(d) to be performed at least three times, the first and third times with said substitution signals not affected by said attenuating means and the second time with said substitution signals at a level reduced by said attenuating means, with no sampling signal being produced during said second time, while sampling signals are produced during said first and third times in response to said substitution signals having the same frequency.

26. Apparatus for detecting which of a plurality of channels transmitted over a cable is selected by a cable converter for a television comprising:

a multifrequency input adapted to be coupled to said cable;

a multifrequency output coupled to said multifrequency input and adapted to be coupled to said converter;

a single frequency input adapted to be coupled with said converter;

a single frequency output adapted to be coupled with said television; and means, coupling said single frequency input to said single frequency output, for detecting which of said channels has been selected by said converter.

27. Apparatus as in claim 26 wherein said detecting means includes:

means, connected to said converter, for intermittently substituting signals for said plurality of channels applied to said converter;

memory means, connected to said substituting means, for storing indications of predetermined frequencies of said substituting signals, said substituting means retrieving said indications to generate said substitution signals; and means for detecting signals from said converter related to said substituted signals to determine which of said channels said converter has selected.

28. Apparatus as in claim 26 further comprising means for generating a confirmed indication of the channel selected by said converter when said detecting means consecutively detects at least twice that said converter is selecting the same channel.

29. Apparatus for detecting which of a plurality of channels transmitted over a cable is selected by a cable converter for a television comprising:

a multifrequency input adapted to be coupled to said cable;

a multifrequency output to said multifrequency input and adapted to be coupled to said converter;

a single frequency input adapted to be coupled with said converter;

a single frequency output adapted to be coupled with said television; and means, coupling said single frequency input to said single frequency output, for detecting which of said channels has been selected by said converter, said detecting means including a receiver for receiving only the frequency generated by said cable converter.

30. Apparatus for detecting which of a plurality of channels transmitted by at least two cables is selected by a cable converter for a television comprising:

a multifrequency input adapted to be coupled to said cables;

a multifrequency output to said multifrequency input and adapted to be coupled to said converter;

a single frequency input adapted to be coupled with said converter;

a single frequency output adapted to be coupled with said television; and means, coupling said single frequency input to said single frequency output, for detecting which of said cables and which of said channels has been selected by said converter.

31. Apparatus for detecting which of a plurality of channels transmitted over a cable is selected by a cable converter for a television comprising:

means for intermittently substituting signals for said channels applied to said cable converter; and means, coupling said converter to said television, for detecting signals from said converter related to said substituted signals to determine which of said channels said converter has selected, said detecting means uncoupling said converter from said television while said substituting means substitutes said signals.

32. Apparatus as in claim 31 further comprising:

means for confirming that said cable converter continues to select the same channel; and means for generating an indication when said confirming means fails to confirm that said cable converter continues to select the same channel during a predetermined plurality of consecutive attempts.

33. Apparatus as in claim 31 further comprising:

means, connected to said substituting means, for selectively reducing the level of said substituted signals; and means for generating a confirmed indication of the channel which said cable converter is selecting after said detecting means has determined that cable converter is selecting the same channel twice, once with said attenuating means inoperative and once with said attenuating means operative.

34. Apparatus as in claim 31 further comprising:

means for receiving power;

means for providing power to said television; and means for generating an indication when said television is drawing power, said substituting means and said detecting means functioning only when said television is drawing power.

35. Apparatus for detecting which of a plurality of channels available over a cable has been selected for reception by a cable converter associated with a television, said apparatus comprising:

a multifrequency input adapted for coupling with said cable;

a multifrequency output adapted for coupling with said converter;

first switch means for selectively coupling said multifrequency input to said multifrequency output;

a single frequency input adapted for coupling with said converter;

a single frequency output adapted for coupling with said television;

second switch means for selectively coupling said single frequency input with said single frequency output;

oscillating means for generating a substitution signal at a frequency related to a frequency control signal;

third switch means for selectively coupling said oscillating means with said multifrequency output;

detecting means, connected to said single frequency input, for generating sampling signals in response to an output of said converter;

means for receiving power;

means, coupled to said power receiving means adapted for providing power to said television;

power determining means, coupled to said power providing means, for determining when said television is drawing power; and control means, coupled to said first, second and third switch means and said oscillating means and responsive to said power determining means and said detecting means for performing the following functions:

(a) periodically, momentarily opening said first and second switch means and closing said third switch means to substitute said substitution signal for signals over said cable applied to said converter, (b) during the momentary period defined in said function (a), determining whether a sampling signal has been generated, (c) when no sampling signal has been generated, changing said frequency control signal and repeating said functions (a) and (b), and (d) when a sampling signal has been generated while said power determining means determines said television is drawing power, producing an indication of the frequency of said substitution signal causing said sampling signal.

36. Apparatus as in claim 35 wherein:

said second switch means is a three position switch;

said apparatus further comprises attenuating means connected to a terminal of said second switch means; and said control means monitors the quality of the television signal received from said converter and causes said second switch means to pass said television signal through said attenuating means when said television signal is of poor quality.

37. Apparatus as in claim 35 wherein:

said apparatus further comprises:

an auxiliary input, fourth switch means for selectively connecting said auxiliary input to said single frequency output, and means for selectively closing said fourth switch means and providing an auxiliary control signal to said control means; and said control means is responsive to said auxiliary control signal to open at least said second switch means.

38. Apparatus as in claim 35 further comprising memory means for storing indications of predetermined frequency control signals to cause said oscillating means to generate substitution signals at desired frequencies, said control means accessing said memory means to retrieve said indications for generating said frequency control signals.

39. Apparatus as in claim 35 wherein said control means generates a confirmed indication of the frequency of the substitution signal only when at least two consecutive performances of said functions (a)-(d) cause said sampling signals to be generated by substitution signals having the same frequency.

40. Apparatus as in claim 35 wherein:

said apparatus further comprises attenuating means, connected to said oscillating means, for selectively reducing the level of said substitution signals, said attenuating means being controlled by said control means; and after said control means receives said sampling signal with said substitution signal not being affected by said attenuating means, said control means performs said functions (a)-(d) with said substitution signals being reduced by said attenuating means, said confirmed indication being produced when said sampling signals resulting from both performance of said functions (a)-(d), are caused by said substitution signals having the same frequency.

41. Apparatus as in claim 40 wherein:

said control means produces said indication when performance of said steps (a)-(d) is repeated at least three times, the first time with said substitution signals not affected by said attenuating means and the second and third times with said substitution signals reduced by said attenuating means, said sampling signals produced by said second and third times being generated in response to said substitution signals having the same frequency different from the substitution signal frequency causing said sampling signal in said first time; and said control means produces said confirmed indication when said control means causes said (a)-(d). to be performed at least three times, the first and third times with said substitution signals not affected by said attenuating means and the second time with said substitution signals at a level reduced by said attenuating means, with no sampling signal being produced during said second time, while sampling signals are produced during said first and third times in response to said substitution signals having the same frequency.

42. A method of detecting which of a plurality of radio frequency carriers available over a radio frequency communications medium has been selected for reception by a communications system, said system including a selector, connected to said medium, for selecting one of said carriers and a receiver for receiving the carrier selected by said selector, said method comprising the steps of:

(a) sequentially applying a plurality of substitution signals to said selector, each of said substitution signals having a frequency substantially the same as the frequency of one of said carriers, respectively;

(b) determining when one of said substitution signals causes said selector to generate an output;

(c) repeating said steps (a) and (b); and (d) generating a confirmed indication of the carrier selected by said selector when it is determined in both said step (b) and said step (c) that said selector generates outputs in response to said substitution signals having the same frequency.

43. A method as in claim 42 further comprising the steps of:

intermittently monitoring said selector to confirm that said selector continues to select the same carrier; and generating an indication that said selector no longer selects said same carrier after said monitoring step fails to confirm that said selector selects said same carrier over a predetermined plurality of consecutive attempts.

44. A method as in claim 42 wherein a second occurrence of said step (a) occurs with said plurality of substitution signals having a different level than the level of said substitution signals during a first occurrence of said step (a).

45. A method of detecting which of a plurality of carriers has been selected for reception by a television system, said system including a selector for selecting one of said carriers, said method comprising the steps of:

counting the number of horizontal sync pulses between consecutive vertical sync pulses in television signals from said selector;

determining from said counting step when said television signals are acceptable; and only after said determination is positive, detecting which of said carriers has been selected by said selector.

46. A method as in claim 45 wherein said determining step produces a positive determination only when at least a first predetermined number of the just previous N counts by said counting step are acceptable and at least the just previous M consecutive ones of those N counts are also acceptable.

47. A method as in class 45 further comprising the step of attenuating said television signals when at least a first predetermined number of the just previous result of N of said counting steps are not acceptable.

48. A method of detecting which of a plurality of radio frequency carriers available over a radio frequency communications medium has been selected for reception by a communications system, said system including a selector, connected to said medium, for selecting one of said carriers and a receiver for receiving the carrier selected by said selector, said method comprising the steps of:

(a) sequentially applying a plurality of substitution signals to said selector, each of said substitution signals having a frequency substantially the same as the frequency of one of said carriers, respectively;
(b) determining when one of said substitution signals causes said selector to generate an output;
(c) repeating said steps (a) and (b) until a positive determination in said step (b) is made; and
(d) after a positive determination in said step (b), ceasing to perform said steps (a)-(c) and instead intermittently monitoring said selector to confirm that said selector continues to select the same carrier.

49. A method of detecting which of a plurality of radio frequency carriers available over a radio frequency communications medium has been selected for reception by a communications system, said system including a selector, connected to said medium, for selecting one of said carriers and a receiver for receiving the carrier selected by said selector, said method comprising the steps of:

(a) sequentially applying a plurality of substitution signals to said selector, each of said substitution signals having a frequency substantially the same as the frequency of one of said carriers, respectively;
(b) determining whether one of said substitution signals causes said selector to generate an output;
(c) when said determination in said step (b) is positive, sequentially applying said plurality of substitution signals to said selector at a lower level than in said step (a);
(d) determining whether one of said substitution signals applied in said step (c) causes said selector to generate an output;
(e) when said determination in said step (d) is negative, sequentially applying said plurality of substitution signals to said selector at a higher level than in said step (c);
(f) determining whether one of said substitution signals applied in said step (e) causes said selector to generate an output;
(g) when said determination in said step (d) is positive but caused by one of said substitution signals having a frequency different from the frequency of said one of said substitution signals causing a positive determination in said step (b), sequentially applying said plurality of substitution signals to said selector at a lower level than in said step (a);
(h) determining whether one of said substitution signals applied in said step (g) causes said selector to generate an output; and
(i) generating a confirmed indication of the carrier selected by said selector when any one of the following three situations occurs:
(1) positive determinations in both said step (b) and said step (d) are caused by said substitution signals having the same frequency,
(2) positive determinations in both said step (b) and said step (f) are caused by said substitution signals having the same frequency, and
(3) positive determination in both said step (d) and said step (h) are caused by said substitution signals having the same frequency.

50. A method as in claim 49 wherein:
said method further comprises the step of determining when said receiver is drawing power; and
at least said step (i) is not performed when said receiver is not drawing power.

51. A method of detecting which of a plurality of channels available over a cable has been selected by a cable converter associated with a television, said method comprising the steps of:

(a) sequentially applying a plurality of substitution signals to said converter, each of said substitution signals having a frequency substantially the same as the carrier frequency of one of said channels, respectively;
(b) determining whether one of said substitution signals causes said converter to generate an output;
(c) repeating said steps (a) and (b); and
(d) generating an indication of the channel selected by said converter when it is determined in both said step (b) and said step (c) that said converter generated outputs in response to said substitution signals having the same frequency.

52. A method as in claim 51 further comprising the steps of:
confirming at predetermined intervals that said cable converter continues to select the same channel; and
generating an indication that said cable converter no longer selects the same channel after said confirming step is negative over a predetermined plurality of consecutive attempts.

53. A method as in claim 51 wherein a second occurrence of said step (a) occurs with the level of said plurality of signals being different.

54. A method as in claim 51 wherein:
said method further comprises the steps of determining when said television is drawing more than a predetermined amount of power, and generating an indication that said television is not drawing more than said predetermined amount of power in response to said power determining step; and
at least said step (d) is performed only when said television is drawing power.

55. A method of monitoring the period for which a cable converter associated with a television selects a particular one of a plurality of channels, said method comprising the steps of:
initially determining which of said plurality of channels said converter has selected and generating an indication related thereto;

intermittently monitoring said converter to confirm that said converter continues to select the same carrier; and generating an indication that said converter no longer selects said same channel only after said monitoring step fails to confirm that said converter selects said same channel over a predetermined plurality of consecutive attempts.

56. A method of detecting which of a plurality of radio frequency carriers available over a radio frequency communications medium has been selected for reception by a communications system, said system including a selector, connected to said medium, for selecting one of said carriers and a receiver for receiving the carrier selected by said selector, said method comprising the steps of:

(a) applying a substitution signal to said selector, said substitution signal having a frequency substantially the same as one of said carriers;

(b) determining whether said substitution signal causes said selector to generate an output;

(c) as long as said determination in said step (b) is negative, repeating said steps (a) and (b) with said substitution signal having a frequency reduced from that in the previous execution of said step (a);

(d) when said determination in said step (b) is positive, repeating said steps (a) through (c) with the level of said substitution signal reduced until said determination in said step (b) is positive; and (e) if said step (d) produces said positive determination in response to said substitution signal having the same frequency as said substitution signal causing the previous said positive determination, generating an indication of said carrier related to the frequency of said substitution signal causing said positive determination.

* * * * *